US011275950B2

(12) United States Patent
Zeng et al.

(10) Patent No.: US 11,275,950 B2
(45) Date of Patent: Mar. 15, 2022

(54) METHOD AND APPARATUS FOR SEGMENTING VIDEO

(71) Applicant: Beijing Wodong Tianjun information Technology Co., Ltd., Beijing (CN)

(72) Inventors: Jianping Zeng, Beijing (CN); Jingjing Lyu, Beijing (CN); Yongjun Bao, Beijing (CN)

(73) Assignee: Beijing Wodong Tianjun Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/223,664

(22) Filed: Apr. 6, 2021

(65) Prior Publication Data

US 2021/0224550 A1      Jul. 22, 2021

Related U.S. Application Data

(63) Continuation of application No. PCT/CN2019/103577, filed on Aug. 30, 2019.

(30) Foreign Application Priority Data

Dec. 14, 2018   (CN) .......................... 201811534302.1

(51) Int. Cl.
*G06K 9/00*      (2006.01)
*G06K 9/46*      (2006.01)
(Continued)

(52) U.S. Cl.
CPC ..... *G06K 9/00765* (2013.01); *G06K 9/00758* (2013.01); *G06K 9/4652* (2013.01);
(Continued)

(58) Field of Classification Search
CPC .......... G06K 9/00765; G06K 9/00758; G06K 9/4652; G06K 9/6212; G06K 9/6215; G11B 27/031; G11B 27/06; G11B 27/34
See application file for complete search history.

(56) References Cited

U.S. PATENT DOCUMENTS 6,724,933 B1 *   4/2004   Lin .................... G06K 9/00711
                                                            345/591
2009/0022472 A1    1/2009   Bronstein et al.
(Continued)

FOREIGN PATENT DOCUMENTS

CN          103440640 A       12/2013
CN          104394422 A        3/2015
(Continued)

OTHER PUBLICATIONS

International Search Report for PCT/CN2019/103577, dated Nov. 29, 2019, 3 pgs.
(Continued)

*Primary Examiner* — Mishawn N. Hunter
(74) *Attorney, Agent, or Firm* — Blank Rome LLP

(57) ABSTRACT

Embodiments of the present disclosure provide a method and apparatus for segmenting a video. The method may include: performing video shot segmentation on a to-be-segmented video to obtain an initial video clip set; selecting at least one video clip from the video clip set; determining, for a video clip in the at least one video clip, a semantic similarity between two video clips adjacent to the video clip; and combining two video clips corresponding to a semantic similarity greater than a preset first similarity threshold value in the determined semantic similarity and a video clip between the two video clips to obtain a final video clip set.

20 Claims, 9 Drawing Sheets

(51) Int. Cl.
*G06K 9/62* (2022.01)
*G11B 27/031* (2006.01)
*G11B 27/06* (2006.01)
*G11B 27/34* (2006.01)

(52) U.S. Cl.
CPC ......... *G06K 9/6212* (2013.01); *G06K 9/6215* (2013.01); *G11B 27/031* (2013.01); *G11B 27/06* (2013.01); *G11B 27/34* (2013.01)

(56) References Cited

U.S. PATENT DOCUMENTS

| | | |
|---|---|---|
| 2014/0376886 A1 | 12/2014 | Pettersson et al. |
| 2018/0004735 A1 | 1/2018 | Singh et al. |

FOREIGN PATENT DOCUMENTS

| | | |
|---|---|---|
| CN | 104869403 A | 8/2015 |
| CN | 105228033 A | 1/2016 |
| CN | 108509917 A | 9/2018 |
| CN | 108537134 A | 9/2018 |
| CN | 108647641 A | 10/2018 |
| CN | 108733766 A | 11/2018 |

OTHER PUBLICATIONS

S. Zhou, et al., "Research on Video Similarity Network", Journal of Computer Applications, vol. 30, No. 7, Jul. 2010, 5 pgs.

* cited by examiner

METHOD AND APPARATUS FOR SEGMENTING VIDEO

This patent application is a continuation of International Application No. PCT/CN2019/103577, filed on Aug. 8, 2019, which claims the priority to Chinese Application No. 201811534302.1, filed on Dec. 14, 2018 by Beijing Wodong Tianjun Information Technology Co., Ltd., and entitled "Method and Apparatus for Segmenting Video," the contents of which are hereby incorporated by reference in their entireties.

TECHNICAL FIELD

Embodiments of the present disclosure relate to the field of computer technology, and specifically to a method and apparatus for segmenting a video.

BACKGROUND

A video shot segmentation method is a method of segmenting a video into shots (or shots and shot boundaries), and is a basic technique in applications such as a video retrieval, a video abstract, and video editing and making. Here, a shot refers to a video clip having relatively consecutive image contents. A shot abrupt change refers to a direct video scene switch without an intermediate transition. For the shot abrupt change, there is an abruptly changed shot boundary between two scenes before and after the switch. A shot gradual change refers to a gradual transition from one scene to another scene in a certain way, including fade-in, fade-out, image superposition, and the like. For the shot gradual change, there is a gradually changed shot boundary between two scenes before and after the transition.

In an existing video shot segmentation method, a similarity between images is generally determined using various image features (e.g., a color histogram feature, an image edge feature and a region texture) and in combination with an empirical rule, a support vector machine, or other classification techniques. On this basis, video shot segmentation is implemented.

SUMMARY

Embodiments of the present disclosure provide a method and apparatus for segmenting a video.

In a first aspect, embodiments of the present disclosure provides a method for segmenting a video. The method includes: performing video shot segmentation on a to-be-segmented video to obtain an initial video clip set; selecting at least one video clip from the video clip set; determining, for a video clip in the at least one video clip, a semantic similarity between two video clips adjacent to the video clip; and combining two video clips corresponding to a semantic similarity greater than a preset first similarity threshold value in the determined semantic similarity and a video clip between the two video clips to obtain a final video clip set.

In a second aspect, embodiments of the present disclosure provides an apparatus for segmenting a video. The apparatus includes a segmenting unit, configured to perform video shot segmentation on a to-be-segmented video to obtain an initial video clip set; a determining unit, configured to select at least one video clip from the video clip set, and determine, for a video clip in the at least one video clip, a semantic similarity between two video clips adjacent to the video clip; and a combining unit, configured to combine two video clips corresponding to a semantic similarity greater than a preset first similarity threshold value in the determined semantic similarity and a video clip between the two video clips to obtain a final video clip set.

In a third aspect, embodiments of the present disclosure provides an electronic device for segmenting a video, the electronic device including one or more processors; and a storage apparatus, configured to store one or more programs. The one or more programs, when executed by the one or more processors, cause the one or more processors to implement a method in any embodiment of the method for segmenting a video.

In a fourth aspect, embodiments of the present disclosure provides a computer readable medium for segmenting a video. The computer readable medium stores a computer program, where the program, when executed by a processor, implements a method in any embodiment of the method for segmenting a video.

BRIEF DESCRIPTION OF THE DRAWINGS

After reading detailed descriptions of non-limiting embodiments given with reference to following accompanying drawings, other features, objectives and advantages of the present disclosure will be more apparent.

DETAILED DESCRIPTION OF EMBODIMENTS

The present disclosure is further described below in detail by combining accompanying drawings and embodiments. It may be appreciated that the specific embodiments described herein are merely used for explaining the relevant disclosure, rather than limiting the disclosure. In addition, it should also be noted that, for the ease of description, only the parts related to the relevant disclosure are shown in the accompanying drawings.

It should be noted that embodiments in the present disclosure and the features in the embodiments may be combined with each other on a non-conflict basis. The present disclosure will be described below in detail with reference to the accompanying drawings and in combination with the embodiments.

Figure 1:
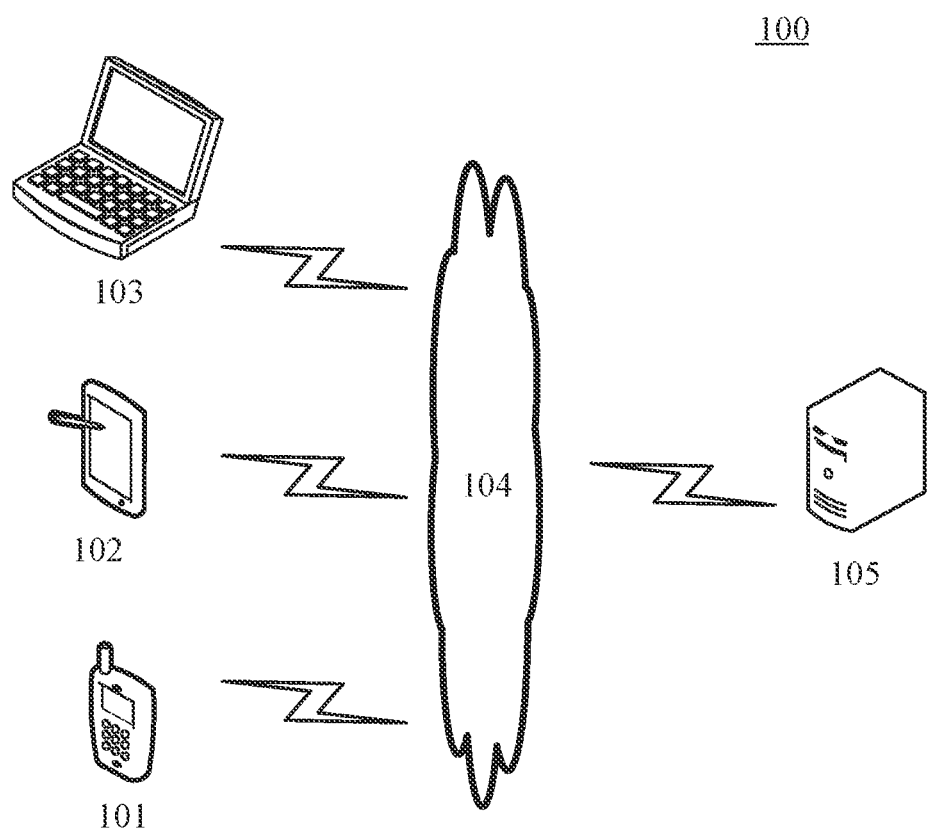
FIG. 1 is a diagram of an example system architecture in which embodiments of the present disclosure may be applied.

FIG. 1 illustrates an example system architecture 100 in which a method for segmenting a video or an apparatus for segmenting a video according to embodiments of the present disclosure may be applied.

As shown in FIG. 1, the system architecture 100 may include terminal devices 101, 102 and 103, a network 104, and a server 105. The network 104 serves as a medium providing a communication link between the terminal devices 101, 102 and 103 and the server 105. The network 104 may include various types of connections, for example, wired or wireless communication links, or optical fiber cables.

A user may use the terminal devices 101, 102 and 103 to interact with the server 105 via the network 104 to receive or send data (e.g., a video). Various communication client applications (e.g., video playback software, a video processing application, a webpage browser application, a shopping application, a search application, an instant communication tool, a mailbox client and social platform software) may be installed on the terminal devices 101, 102 and 103.

The terminal devices 101, 102 and 103 may be hardware or software. When the terminal devices 101, 102 and 103 are the hardware, they may be various electronic devices having a display screen and supporting a data transmission, the electronic devices including, but not limited to, a smartphone, a tablet computer, a laptop portable computer, a desktop computer, etc. When being the software, the terminal devices 101, 102 and 103 may be installed in the above listed electronic devices. The terminal devices may be implemented as a plurality of pieces of software or a plurality of software modules (e.g., software or software modules for providing a distributed service), or as a single piece of software or a single software module, which will not be specifically defined here.

The server 105 may be a server providing various services, for example, a backend server providing support for a video displayed on the terminal devices 101, 102 and 103. The backend server may perform processing such as an analysis on data such as a received video processing request, and feed back the processing result (e.g., a video clip or other data obtained after a video is segmented) to an electronic device (e.g., a terminal device) communicated with the backend server.

It should be noted that the method for segmenting a video provided by the embodiments of the present disclosure may be performed by the server 105. Correspondingly, the apparatus for segmenting a video may be provided in the server 105. In addition, the method for segmenting a video provided by the embodiments of the present disclosure may also be performed by the terminal devices 101, 102 and 103. Correspondingly, the apparatus for segmenting a video may be also provided in the terminal devices 101, 102 and 103.

It should be noted that the server may be hardware or software. When the server is the hardware, the server may be implemented as a distributed server cluster composed of a plurality of servers, or as a single server. When the server is the software, the server may be implemented as a plurality of pieces of software or a plurality of software modules (e.g., software or software modules for providing a distributed service), or as a single piece of software or a single software module, which will not be specifically defined here.

It should be appreciated that the numbers of the terminal devices, the networks, and the servers in FIG. 1 are merely illustrative. Any number of terminal devices, networks, and servers may be provided based on actual requirements. When an electronic device on which the method for segmenting a video runs does not need to transmit data with an other electronic device, the system architecture may only include the electronic device (e.g., the terminal devices 101, 102 and 103 or the server 105) on which the method for segmenting a video runs.

Figure 2:
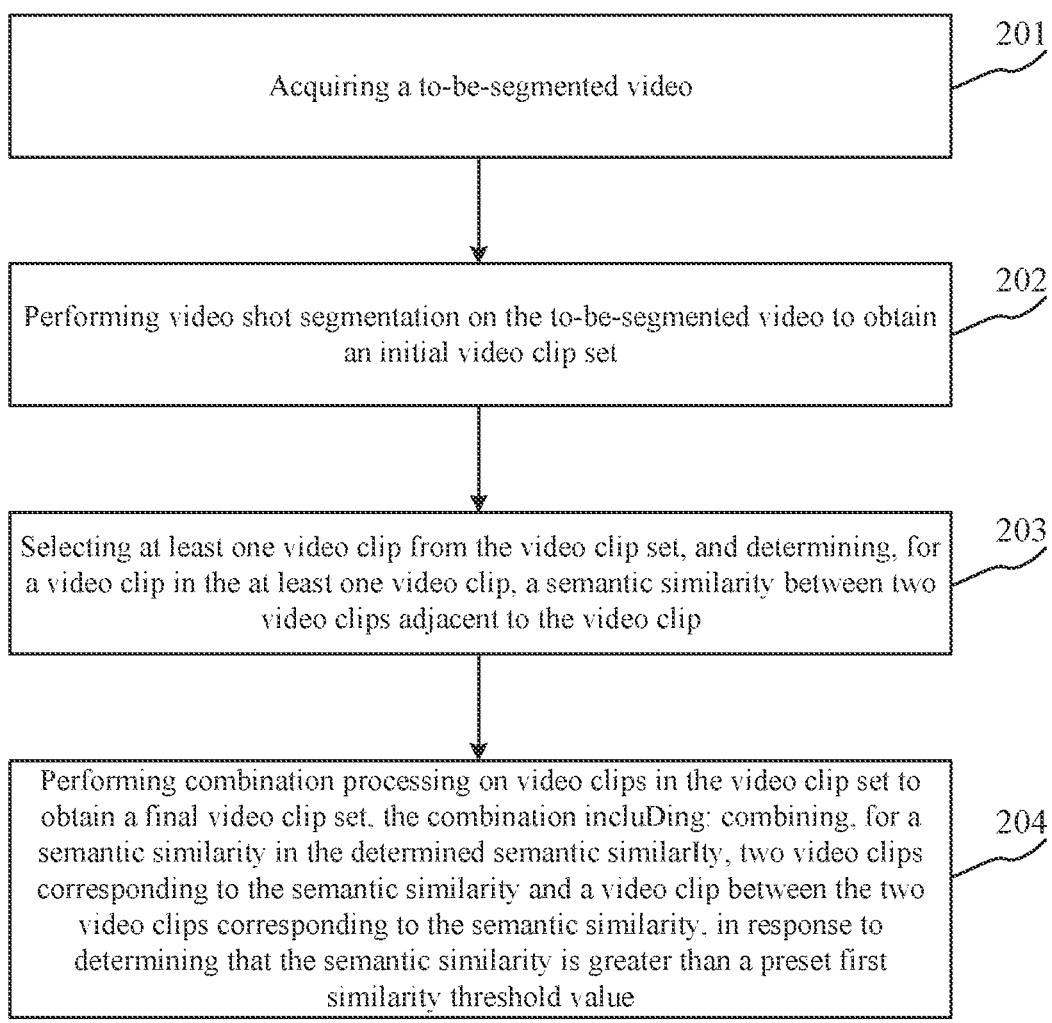
FIG. 2 is a flowchart of a method for segmenting a video according to embodiments of the present disclosure.

Further referring to FIG. 2, FIG. 2 illustrates a flow 200 of a method for segmenting a video according to embodiments of the present disclosure. The method for segmenting a video includes the following steps.

Step 201, acquiring a to-be-segmented video.

In this embodiment, an executing body (e.g., the server or the terminal devices shown in FIG. 1) of the method for segmenting a video may acquire the to-be-segmented video from an other electronic device by means of a wired connection or a wireless connection. Here, the to-be-segmented video may be a video on which segmentation is to be performed.

When the executing body is a terminal device, the executing body may acquire a to-be-segmented video from an other electronic device communicated with the executing body, or acquire a to-be-segmented video pre-stored locally. For example, the executing body may be a terminal device having a video segmentation functionality, which may acquire a to-be-segmented video from an other terminal device not having a video segmentation functionality. When the executing body is a server, the executing body may acquire a to-be-segmented video from an other electronic device (e.g., a terminal device or server not having a video segmentation functionality but storing video that needs to be segmented) communicated with the executing body, or acquire a to-be-segmented video pre-stored locally.

Step 202, performing video shot segmentation on the to-be-segmented video to obtain an initial video clip set.

In this embodiment, the executing body may perform the video shot segmentation on the to-be-segmented video acquired in step 201 to obtain the initial video clip set.

Here, the video shot segmentation is also referred to as a shot change detection, the purpose of which is to obtain a shot in the video. Here, the shot is composed of adjacent video frames in the video, and the shot is a basic unit constituting the video. As an example, the shot may refer to consecutive video frames corresponding to a scene in the video.

For example, the video shot segmentation may include, but not limited to, at least one of: a pixel method, a histogram method, an edge contour change rate method, or the like.

Here, the initial video clip set may refer to a plurality of video clips obtained by performing the video shot segmentation on the to-be-segmented video.

In some alternative implementations of this embodiment, the performing video shot segmentation on the to-be-segmented video in step 202 may include: performing partial video shot segmentation on the to-be-segmented video. Here, video clips in the initial video clip set obtained by performing the partial video shot segmentation includes a video clip representing a partial shot.

Figure 3:
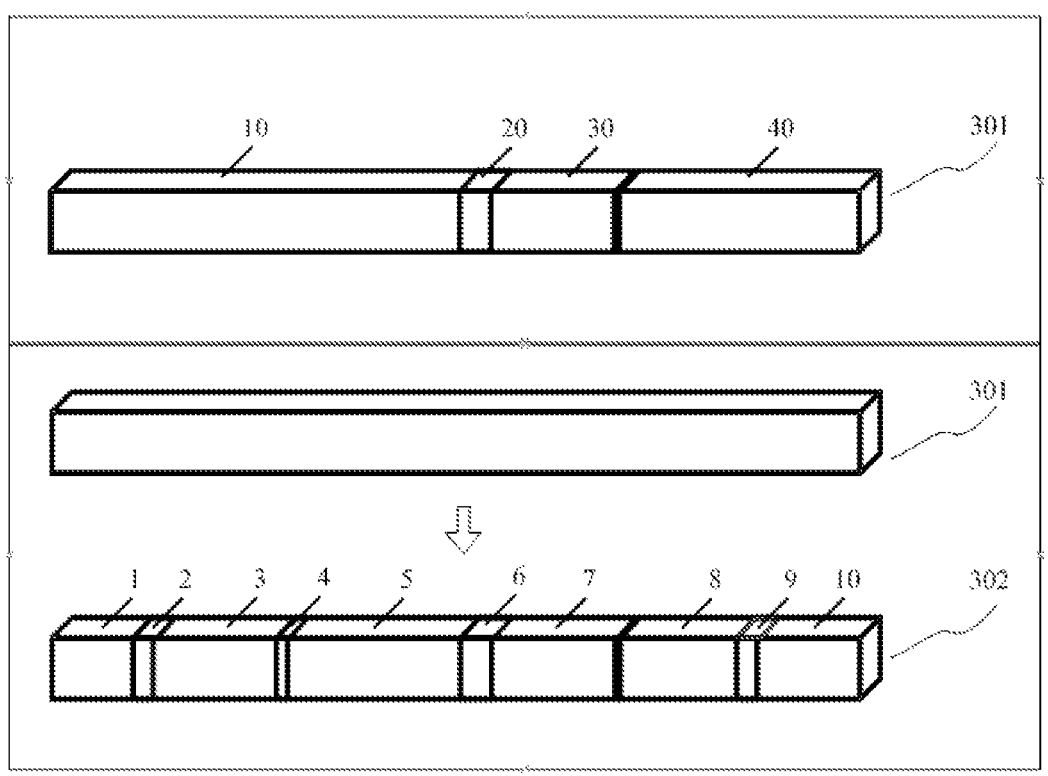
FIG. 3 is a schematic diagram of an operation of performing partial video shot segmentation on a to-be-segmented video according to embodiments of the present disclosure.

As an example, reference is made to FIG. 3. FIG. 3 is a schematic diagram of an operation of performing partial video shot segmentation on a to-be-segmented video according to embodiments of the present disclosure. As shown in FIG. 3, a to-be-segmented video 301 includes a shot 10, a shot 20, a shot 30 and a shot 40. The executing body performs partial video shot segmentation on the to-be-segmented video 301, thus obtaining an initial video clip set 302. The initial video clip set 302 includes video clips 1-10. Here, the video clips 1-4 constitute the shot 10 (i.e., the video frames included in the video clips 1-4 constitute the shot 10), the video clip 5 and the shot 20 are composed of the same video frame, the video clip 6 and the shot 30 are composed of the same video frame, and the video clips 7-10 constitute the shot 40. Here, the video clips in the initial video clip set 302 obtained by performing the partial video shot segmentation include a video clip representing a partial shot, for example, the video clips 1, 2, 3, 4, 7, 8, 9 and 10 represent a partial shot, respectively. The partial shot refers to a part of a shot. In the drawing, the video clip 1 represents a partial shot, that is, the video clip 1 is a part of the shot 10.

It should be noted that the partial video shot segmentation is excessive video shot segmentation, and the number of video clips obtained by performing the partial video shot segmentation on the to-be-segmented video may be greater than the number of shots included in the to-be-segmented video.

It may be appreciated that more video clips may be obtained by performing the partial video shot segmentation on the to-be-segmented video, and the obtained video clips may be combined through a subsequent step. Thus, the accuracy of segmenting the to-be-segmented video into shots may be improved, thereby enriching the approach of determining a shot from the video.

It should be noted that the accuracy of the segmentation for the video may be improved based on the approach of combining the excessive segmentation and the subsequent step (e.g., a semantic combination, i.e., performing combination processing to obtain a final video clip set in step 204) in the embodiment of the present disclosure.

In some alternative implementations of this embodiment, the executing body may perform the partial video shot segmentation on the to-be-segmented video according to the following steps.

In a first step, for an adjacent video frame pair in at least one adjacent video frame pair included in the to-be-segmented video, a dissimilarity between two adjacent video frames included in the adjacent video frame pair is determined based on two feature vectors of the two adjacent video frames included in the adjacent video frame pair.

The adjacent video frame pair may refer to two adjacent video frames included in the to-be-segmented video. As an example, it is assumed that the to-be-segmented video includes a video frame 1, a video frame 2 and a video frame 3. The adjacent video frame pair included in the to-be-segmented video may refer to any of: the video frame 1 and the video frame 2, or the video frame 2 and the video frame 3.

A feature vector may be used to represent a feature (e.g., a color feature and a texture feature) of a video frame. The above method of extracting a feature vector of a video frame may be various feature vector extraction methods existing or now unknown but proposed in the future, for example, a color histogram or a Histogram of Oriented Gradient (HOG).

As an example, for each adjacent video frame pair in the at least one adjacent video frame pair included in the to-be-segmented video, the executing body may determine a dissimilarity between two adjacent video frames included in the adjacent video frame pair based on two feature vectors of the two adjacent video frames included in the adjacent video frame pair. The dissimilarities between two adjacent video frames included in all adjacent video frame pairs included in the to-be-segmented video are thus obtained. For example, it is assumed that the to-be-segmented video includes a video frame 1, a video frame 2, a video frame 3 and a video frame 4. The executing body may determine that all adjacent video frame pairs included in the to-be-segmented video include: an adjacent video frame pair consisting of the video frame 1 and the video frame 2, an adjacent video frame pair consisting of the video frame 2 and the video frame 3, and an adjacent video frame pair consisting of the video frame 3 and the video frame 4. Accordingly, the executing body may calculate the dissimilarity between the video frame 1 and the video frame 2, the dissimilarity between the video frame 2 and the video frame 3, and the dissimilarity between the video frame 3 and the video frame 4, respectively.

Figure 4A:
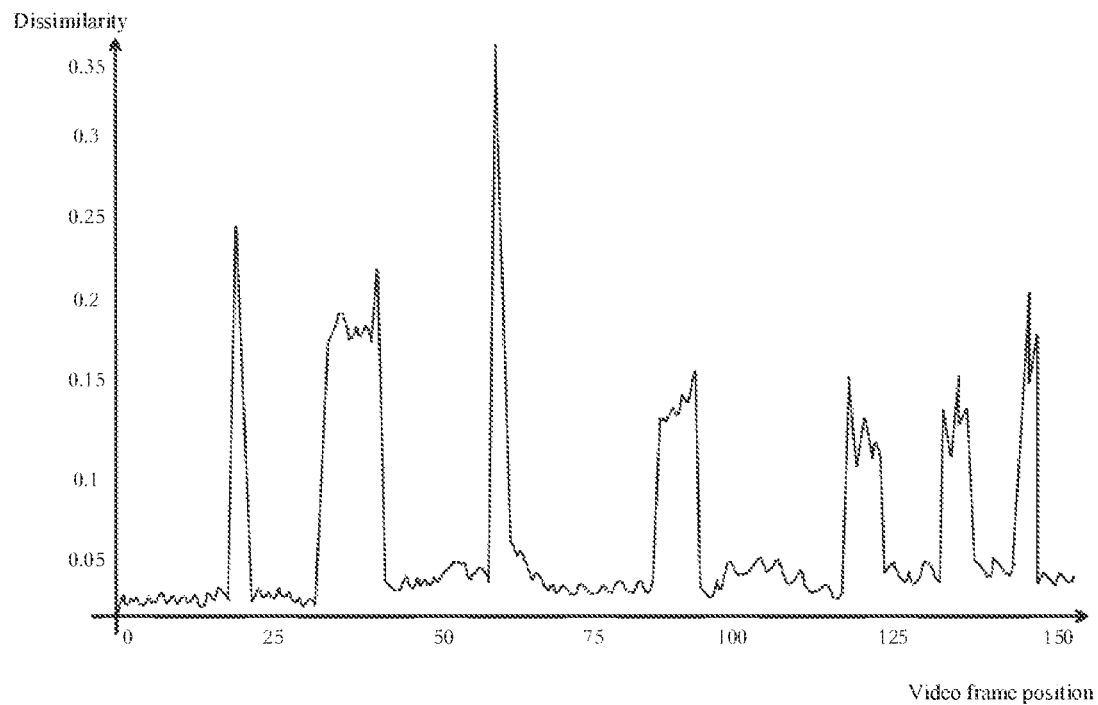
FIG. 4A is a schematic diagram of a corresponding relationship between a dissimilarity and a position of a video frame according to embodiments of the present disclosure.

Referring to FIG. 4A, FIG. 4A is a schematic diagram of a corresponding relationship between a dissimilanty and a position of a video frame according to embodiments of the present disclosure. In the figure, a horizontal coordinate represents a position of a video frame (e.g., the position of the first video frame of the to-be-segmented video is represented by 1, the position of the second video frame of the to-be-segmented video is represented by 2, and so on).

Alternatively, the executing body may also determine, for a part (not all) of adjacent video frame pairs in all the adjacent video frame pairs included in the to-be-segmented video, a dissimilarity between two adjacent video frames included in an adjacent video frame pair based on two feature vectors of the two adjacent video frames included in the adjacent video frame pair. The dissimilarity between two adjacent video frames included in a part of adjacent video frame pairs in all the adjacent video frame pairs included in the to-be-segmented video is thus obtained. For example, it is assumed that the to-be-segmented video includes a video frame 1, a video frame 2, a video frame 3 and a video frame 4. The executing body may determine that all adjacent video frame pairs included in the to-be-segmented video include: an adjacent video frame pair consisting of the video frame 1 and the video frame 2, an adjacent video frame pair consisting of the video frame 2 and the video frame 3, and an adjacent video frame pair consisting of the video frame 3 and the video frame 4. Accordingly, the executing body may only calculate the dissimilarity between the video frame 1 and the video frame 2 and the dissimilarity between the video frame 3 and the video frame 4.

It should be noted that the dissimilarity may generally represent a degree of dissimilarity between video frames. It may be appreciated that the scheme of calculating the dissimilarity may be converted into a scheme of calculating a similarity based on the same concept. Therefore, both the scheme of calculating the dissimilarity and the scheme of calculating the similarity shall fall within the scope of protection of the technical solution as claimed in the present disclosure.

Based on the feature vectors of the two video frames, the method of calculating the similarity between the two video frames may be a normalized correlation based method, a histogram cross kernel based method, or an other method of calculating a similarity between video frames. The method of calculating the similarity between the two video frames is a well-known technique widely studied by those skilled in the art, which will not be repeatedly described here. The dissimilarity between the two video frames may be a difference between a predetermined numerical value (e.g., 1) and the similarity between the two video frames.

In a second step, the partial video shot segmentation is performed on the to-be-segmented video based on the determined dissimilarity.

In some alternative implementations of this embodiment, the executing body may perform the second step according to the following steps.

In a first sub-step, a video frame change position of the to-be-segmented video is determined based on the determined dissimilarity, to obtain a position information set representing the determined video frame change position.

The video frame change position may be a position of a video frame meeting a preset condition and included in the to-be-segmented video. The preset condition may refer to that the dissimilarity between the video frame and a next video frame (or a previous video frame) of the video frame is greater than a preset dissimilarity threshold value. The video frame change position may alternatively be determined according to a predetermined method. The preset condition may alternatively refer to that the dissimilarity between the video frame and the next video frame (or the previous video frame) of the video frame is greater than the product of the maximum dissimilarity in the determined dissimilarity and a predetermined numerical value (e.g., 0.8).

The video frame change position may alternatively be obtained according to a predetermined method. The predetermined method may be a kernel temporal segmentation (KTS) method. An input parameter of the KTS method is the number of segmented shots, and a parameter is set to represent a mean number of video frames of each shot, such that the number of the segmented shots and the set parameter satisfy the following formula:

$N\_(max\_shots) = \lfloor N/N\_(mean\_stime) \rfloor$.

Here, N_(max_shots) represents the number of the segmented shots, N_(mean_stime) represents the mean number of the video frames of the each shot, N is the number of video frames of the to-be-segmented video, and the symbol "$\lfloor \; \rfloor$" represents rounding down. It may be appreciated that rounding down is performed on the ratio of the number of the video frames of the to-be-segmented video to the mean number of the video frames of the each shot, and thus, the number of the segmented shots may be obtained. Since more video frame change positions are to be detected using the KTS method so as to perform the partial video shot segmentation on the video, N_(mean_stime) may be set to a relatively small value, for example, the value range of N_(mean_stime) may be from 10 to 30.

Figure 4B:
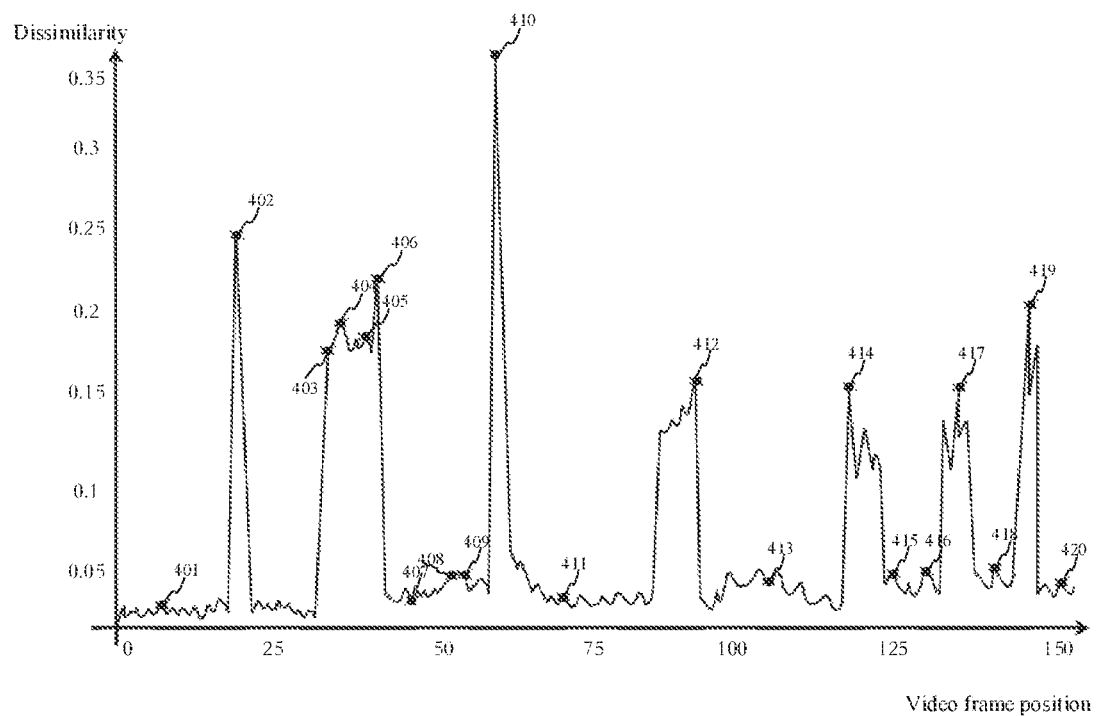
FIG. 4B is a schematic diagram of a position indicated by position information in a position information set according to embodiments of the present disclosure.

For example, reference is made to FIG. 4B. FIG. 4B is a schematic diagram of a position indicated by position information in a position information set according to embodiments of the present disclosure. As shown in FIG. 4B, the executing body obtains a position information set by adopting the KTS method. Here, a position indicated by position information in the position information set refers to video frame positions 401-420 shown in FIG. 4B.

In a second sub-step, for a video frame include in the to-be-segmented video, in response to determining that the video frame meets a predetermined first preset condition, position information representing a position of the video frame in the to-be-segmented video is added to the position information set. Here, the first preset condition may be a condition preset by a technician. For example, the first preset condition may refer to a video frame of which the dissimilarity to a video frame at a position indicated by position information in the video frame change position (the position information set before the addition) is greater than a preset threshold value.

Here, the executing body may fit the dissimilarities between two adjacent video frames included in all the adjacent video frame pairs included in the obtained to-be-segmented video, thereby obtaining a curve (e.g., a curve shown in FIG. 4A) representing a corresponding relationship between dissimilarity of two adjacent video frames and a position of a video frame. Thus, the executing body may determine the dissimilarity corresponding to each video frame included in the to-be-segmented video. The first preset condition may refer to a video frame at a position represented by position information in the position information set (the position information set before the addition), where a next video frame of the video frame has a corresponding dissimilarity greater than or equal to a dissimilarity corresponding to the video frame. The first preset condition may also refer to a video frame at a position represented by position information in the position information set (the position information set before the addition), where the video frame has a corresponding dissimilarity greater than a dissimilarity corresponding to a next video frame of the video frame.

As an example, the executing body may perform the addition on the position information set according to the following steps.

First, the executing body may calculate, for each video frame, whether a dissimilarity corresponding to a next video frame of the video frame is greater than or equal to a dissimilarity corresponding to the video frame, where the calculation starts from the first video frame included in the to-be-segmented video, and goes backwards in sequence until the next-to-last video frame (i.e., a previous frame of the last frame) included in the to-be-segmented video. If the dissimilarity corresponding to the next video frame of the video frame is greater than or equal to the dissimilarity corresponding to the video frame, and position information of a position (a position of the video frame in the to-be-segmented video) of the video frame belongs to the position information set (the position information set before the addition), position information of a position of the next video frame of the video frame is added to the position information set (the position information set before the addition).

Then, the executing body may calculate, for each video frame, whether a dissimilarity corresponding to the video frame is greater than or equal to a dissimilarity corresponding to a next video frame of the video frame, where the calculation starts from the next-to-last video frame (i.e., the previous frame of the last frame) included in the to-be-segmented video, and goes forwards in sequence until the first video frame included in the to-be-segmented video. If the dissimilarity corresponding to the video frame is greater than or equal to the dissimilarity corresponding to the next video frame of the video frame, and position information of a position (a position of the next video frame of the video frame in the to-be-segmented video) of the next video frame of the video frame belongs to the position information set (the position information set before the addition), position information of a position of the video frame is added to the position information set (the position information set before the addition).

Accordingly, the position information set obtained after the addition is obtained. The expanded position information set is a union of the two position information sets obtained after the two additions.

Figure 4C:
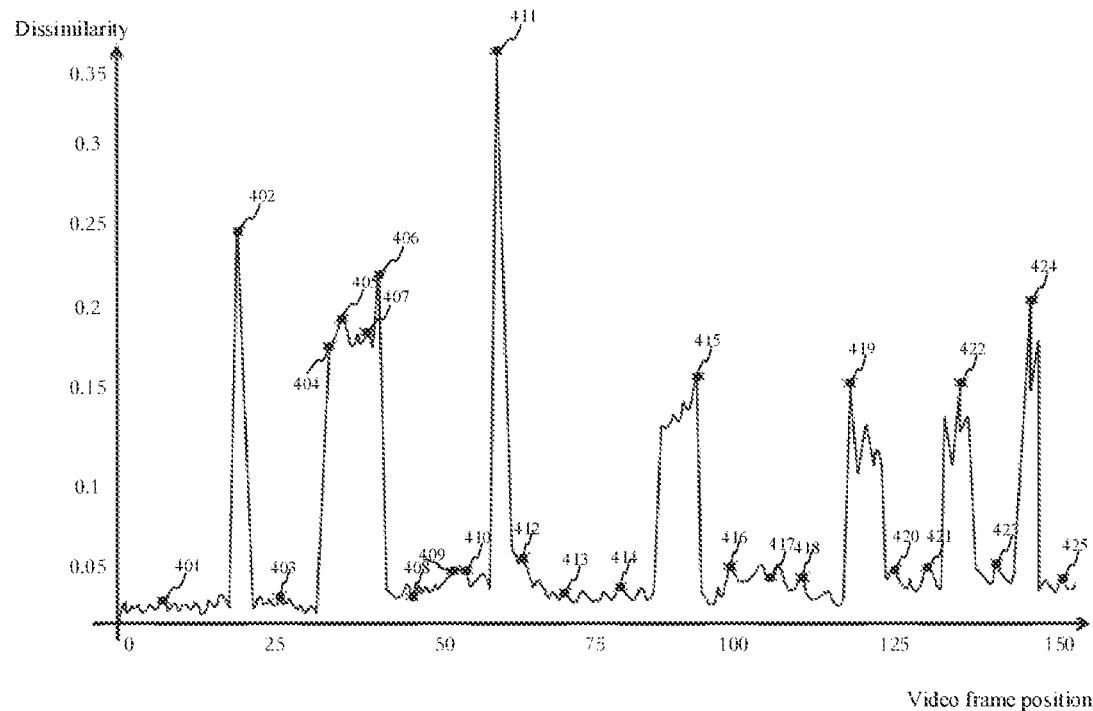
FIG. 4C is a schematic diagram of a position indicated by position information in a position information set obtained after an addition according to embodiments of the present disclosure.

For example, reference is made to FIG. 4C. FIG. 4C is a schematic diagram of a position indicated by position information in a position information set obtained after an addition according to embodiments of the present disclosure. As shown in FIG. 4C, the executing body expands the position information set according to the method shown in the example to obtain a new position information set (i.e., the position information set obtained after the addition). Here, a position indicated by position information in the new position information set refers to video frame positions 401-425 shown in FIG. 4C.

It may be appreciated that the method in the embodiment of the present disclosure may be made more robust by expanding the position information set.

In a third sub-step, the to-be-segmented video is segmented at a position indicated by position information in the position information set obtained after the addition, to perform the partial video shot segmentation.

It may be appreciated that, by segmenting the to-be-segmented video at the position indicated by the position information in the position information set obtained after the addition to perform the partial video shot segmentation, the initial video clip set described in step 202 may be obtained.

Step 203, selecting at least one video clip from the video clip set, and determining, for a video clip in the at least one video clip, a semantic similarity between two video clips adjacent to the video clip.

In this embodiment, the executing body may select the at least one video clip from the video clip set obtained in step 202. Then, for the video clip in the at least one video clip, the similarity between the two video clips adjacent to the video clip is determined.

As an example, the executing body may select the at least one video clip from the video clip set according to the following steps.

In a first step, for position information in the position information set, in the situation where it is determined that a dissimilarity between two video frames adjacent to a video frame at a position indicated by the position information is less than a predetermined dissimilarity threshold value, the executing body may delete the position information from the position information set.

The position information set may be the position information set obtained after the addition, or may be the position information set (i.e., the position information set obtained in the first sub-step) before the addition that represents the determined video frame change position.

The dissimilarity threshold value may be a numerical value preset by the technician. For example, when the dissimilarity is represented by a numerical value between 0 and 1, and the larger the numerical value is, the higher the represented dissimilarity is, the dissimilarity threshold value may be 0.04, 0.05, or the like.

It may be appreciated that incorrectly detected position information may be eliminated from the position information set to a certain extent in the first step. A dissimilarity corresponding to a video frame at a position indicated by the incorrectly detected position information is less than the dissimilarity threshold value, which may indicate that the possibility that the video frame at the position belongs to a shot boundary is small. Accordingly, it helps to improve the accuracy of determining the position of the shot boundary, which is conductive to improving the accuracy of the segmentation for the video.

In some usage situations, the dissimilarity threshold value may be determined by the technician, the executing body or an other electronic device communicated with the executing body through the following steps.

First, dissimilarities corresponding to respective video frames included in the to-be-segmented video are sorted in an ascending order to obtain a dissimilarity sequence.

Then, a dissimilarity corresponding to a video frame at a predetermined position (e.g., the fourth quintile point, and the fifth seven equal diversion point) is selected from an end of the minimum (or maximum) dissimilarity in the dissimilarity sequence as the dissimilarity threshold value. For example, the executing body may divide the dissimilarity sequence into two parts, one part including 80% of the number of dissimilarities included in the dissimilarity sequence, and the other part including 20% of the number of the dissimilarities included in the dissimilarity sequence. Here, the minimum dissimilarity included in the dissimilarity sequence is contained in the part including 80% of the number of the dissimilarities included in the dissimilarity sequence. Accordingly, the maximum similarity in the part including the minimum dissimilarity may be determined as the dissimilarity threshold value.

It may be appreciated that, by determining the maximum similarity in the part including the minimum dissimilarity as the dissimilarity threshold value, an error in setting the dissimilarity threshold value subjectively may be avoided to a certain extent. On this basis, the accuracy of the segmentation for the video may be further improved by performing the subsequent steps in this embodiment.

Alternatively, the dissimilarity threshold value may also be determined by the technician, the executing body or the other electronic device communicated with the executing body through the following steps.

First, a mean value of the dissimilarities corresponding to the video frames included in the to-be-segmented video is determined.

Then, the product of the obtained mean value and a predetermined numerical value (e.g., 1.0.9, or the like) is determined as the dissimilarity threshold value.

Figure 4D:
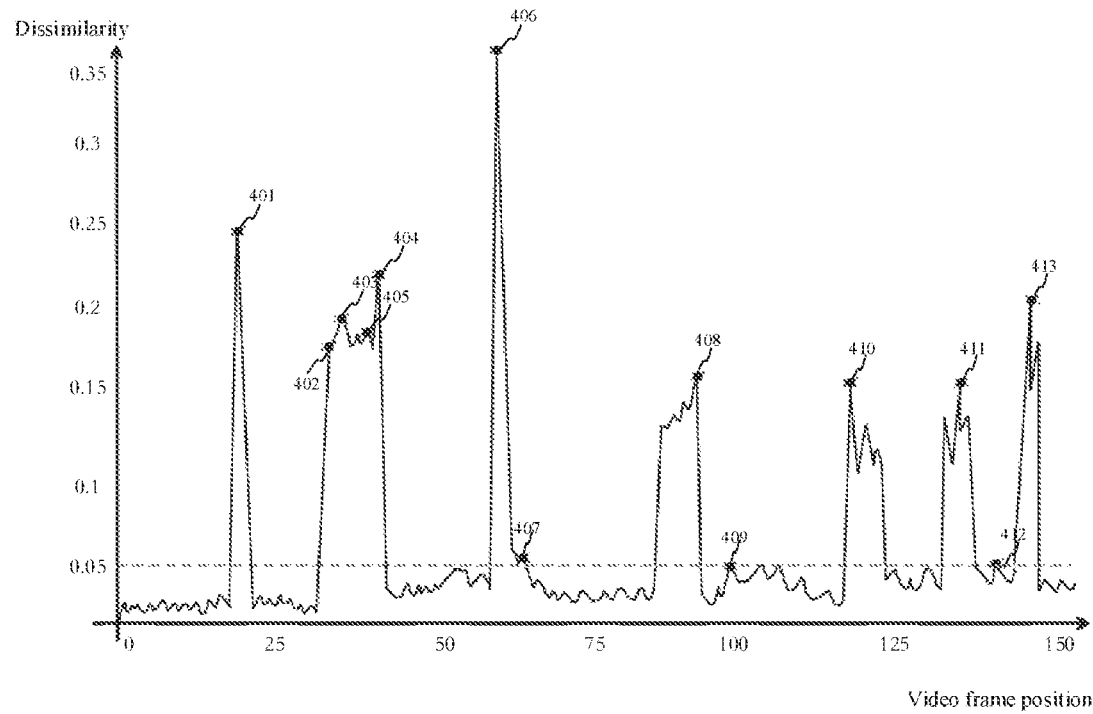
FIG. 4D is a schematic diagram of a position indicated by remaining position information after a deletion for position information in a position information set according to embodiments of the present disclosure.

As an example, reference is made to FIG. 4D. FIG. 4D is a schematic diagram of a position indicated by remaining position information after a deletion for position information in a position information set according to an embodiment of the present disclosure. As shown in FIG. 4D, the executing body deletes position information in a position information set after determining that a dissimilarity corresponding to a video frame at a position indicated by the position information is less than a dissimilarity threshold value (the dissimilarity threshold value shown in FIG. 4D is 0.05), and reserves a position (which refers to positions 401-413) indicated by position information.

In a second step, the executing body may extract position information belonging to a target category from the position information set after the deletion.

Here, the position information in the position information set may be divided into an abrupt change category and a gradual change category. The target category may refer to the gradual change category.

Specifically, the executing body may determine a category of position information according to the following steps.

In a first step, position information of positions of the first video frame and the last video frame included in the to-be-segmented video is determined as position information of the abrupt change category.

In a second step, for each video frame in video frames from the second video frame included in the to-be-segmented video to the next-to-last video frame (i.e., the previous video frame of the last video frame) included in the to-be-segmented video, a difference value between a dissimilarity corresponding to the video frame and a dissimilarity corresponding to a previous video frame of the video frame is determined as a first difference value of the video frame, and a difference value between the dissimilarity corresponding to the video frame and a dissimilarity corresponding to a next video frame of the video frame is determined as a second difference value of the video frame. A larger difference value in the first difference value of the video frame and the second difference value of the video frame is determined as a large difference value of the video frame, and a smaller difference value in the first difference value of the video frame and the second difference value of the video frame is determined as a small difference value of the video frame. If the video frame satisfies a predetermined abrupt change condition, position information of the position of the video frame is determined as position information of the abrupt change category; otherwise, the position information of the position of the video frame is determined as position information of the gradual change category.

The abrupt change condition may include at least one of, the small difference value of the video frame being greater than or equal to a first predetermined numerical value (e.g., 0.1, 0.015, or the like), the quotient of the small difference value of the video frame and the large difference value of the video frame being greater than or equal to a second predetermined numerical value (e.g., 0.80, 0.075, or the like), or the small difference value of the video frame being less than or equal to a third predetermined numerical value.

It may be appreciated that the position information of the gradual change category and the position information of the abrupt change category may be obtained here, and on this basis, an abruptly changed shot boundary and a gradually changed shot boundary may be further obtained, thereby obtaining a shot included in the to-be-segmented video. For example, the to-be-segmented video includes 1000 video frames, the position information of the abrupt change category represents that the position of the 110-th frame in the to-be-segmented video is an abruptly changed shot boundary, and the position information of the gradual change category represents that the positions of the 660-th frame to the 700-th frame in the to-be-segmented video are gradually changed shot boundaries. Therefore, it may be determined that the shot included in the to-be-segmented video includes a video clip including the first video frame to the 109-th video frame, a video clip including the 1-th video frame to the 659-th video frame, and a video clip including the 701-st video frame to the 1000-th video frame.

Here, the first predetermined numerical value, the second predetermined numerical value, and the third predetermined numerical value may be preset numerical values, and the predetermined numerical values (including the first predetermined numerical value, the second predetermined numerical value and the third predetermined numerical value) may be equal or unequal. Here, "first," "second" and "third" are merely used to distinguish the predetermined numerical values, and do not constitute a special limitation to the present disclosure.

It should be noted that, as compared with the existing technology, determining the position information of the gradual change category and the position information of the abrupt change category through the method may improve the speed of the determination for the gradually changed shot boundary and the abruptly changed shot boundary.

In a third step, the executing body may determine a position information pair meeting a second preset condition from the extracted position information. Here, the position information pair may be composed of position information of positions of two video frames.

The second preset condition may be a condition preset by the technician. Video frames between the two video frames corresponding to the position information pair obtained through the second preset condition may constitute a shot.

As an example, a larger similarity in two dissimilarities corresponding to positions respectively indicated by two pieces of position information included in the position information pair is determined as a large similarity of the position information pair, and a smaller similarity is determined as a small similarity of the position information pair. The minimum similarity in dissimilarities corresponding to positions indicated by all pieces of extracted position information is determined as the minimum similarity of the position information pair, and the sum of the small similarity of the position information pair and the large similarity of the position information pair is determined as a sum of similarities of the position information pair. On this basis, the second preset condition may refer to at least one of the following items.

First item: the number of video frames included between the video frames at the positions respectively indicated by the two pieces of position information included in the position information pair is less than or equal to the third predetermined numerical value (e.g., 1).

Second item: a difference value between a dissimilarity corresponding to a latter piece of position information included in the position information pair and a dissimilarity corresponding to a former piece of position information included in the position information pair is less than or equal to a fourth predetermined numerical value (e.g., 5).

Third item: a quotient of the small similarity of the position information pair and the large similarity of the position information pair is greater than or equal to a fifth predetermined numerical value (e.g., 0.6).

Fourth item: a quotient of the minimum similarity of the position information pair and a sum of the similarities of the position information pair is greater than or equal to a sixth predetermined numerical value (e.g., 0.3).

It should be noted that the first predetermined numerical value, the second predetermined numerical value, the third predetermined numerical value, the fourth predetermined numerical value, the fifth predetermined numerical value and the sixth predetermined numerical value may be numerical values respectively predetermined by the technician, and the predetermined numerical values (including the first predetermined numerical value, the second predetermined numerical value, the third predetermined numerical value, the fourth predetermined numerical value, the fifth predetermined numerical value and the sixth predetermined numerical value) may be equal or unequal. Here, "first," "second," "third," "fourth" "fifth" and "sixth" are merely used to distinguish the predetermined numerical values, and do not constitute a special limitation to the present disclosure.

In a fourth step, the executing body may select a video clip between the two positions indicated by the determined position information pair from the video clip set.

It may be appreciated that the video clip set may be obtained by segmenting the to-be-segmented video by the executing body according to a position indicated by position information in the position information set, and when the position information set changes (e.g., position information is added to or deleted from the position information set), the video clip included in the video clip set changes accordingly, and thus, the video clip between the two positions indicated by the determined position information pair is included in the video clip set.

Alternatively, the executing body may also randomly select a predetermined number of video clips from the video clip set. Here, the predetermined number may be a positive integer.

It may be appreciated that a video clip between two video frames corresponding to position information included in a position information pair of the target category may be obtained through the step, and the obtained video clip may refer to a gradually changed shot boundary for separating shots. Accordingly, the obtained gradually changed shot boundary is conductive to improving the accuracy of the segmentation for the video.

In some alternative implementations of this embodiment, the executing body may determine the semantic similarity between the two video clips adjacent to the video clip according to the following steps.

In a first step, a predetermined number of video frames are respectively selected from two video clips adjacent to a target video clip. Here, the predetermined number may be a predetermined number value (e.g., 1, 2, 3 and 4). The two video clips adjacent to the target video clip may be a video clip preceding and adjacent to the target video clip, and a video clip following and adjacent to the target video clip.

The selected video frames may be the predetermined number of video frames that are respectively selected from the two video clips and close to the target video clip, or may be the predetermined number of video frames that are randomly selected.

In a second step, the semantic similarity between the two video clips adjacent to the video clip is determined based on semantic similarities between the selected video frames.

In some alternative implementations of this embodiment, the executing body may determine the semantic similarity between the two video clips adjacent to the video clip according to the following steps.

In a first sub-step, for a video frame in the selected predetermined number of video frames preceding the target video clip, semantic similarities between the video frame and video frames in the selected predetermined number of video frames following the target video clip are determined.

In a second sub-step, a semantic similarity having a maximum numerical value in the determined semantic similarities is determined as the semantic similarity between the two video clips adjacent to the video clip.

Alternatively, the executing body may also determine a mean value of semantic similarities between selected video frame pairs as the semantic similarity between the two video clips adjacent to the video clip. Here, the two video frames included in the video frame pairs may respectively belong to the two video clips adjacent to the target video clip, and the number of video frames between the two video frames included in each video frame pair and the target video clip are equal.

Step 204, performing combination processing on video clips in the video clip set to obtain a final video clip set, the combination processing includes: combining, for a semantic similarity in the determined semantic similarity, two video clips corresponding to the semantic similarity and a video clip between the two video clips corresponding to the semantic similarity, in response to determining that the semantic similarity is greater than a preset first similarity threshold value.

In this embodiment, the executing body may perform the combination processing on the video clip in the video clip set to obtain the final video clip set, the combination processing includes: combining, for a semantic similarity in the determined semantic similarity, the two video clips corresponding to the semantic similarity and a video clip between the two video clips corresponding to the semantic similarity, in the situation where it is determined that the semantic similarity is greater than the preset first similarity threshold value. Here, the first similarity threshold value may be a preset semantic similarity numerical value. As an example, when the semantic similarity is represented by a numerical value between 0 and 1, the first similarity threshold value may be a numerical value between 0.8 and 0.9.

It should be noted that the first similarity threshold value and a second similarity threshold value may be respectively preset similarity numerical values, and the similarity threshold values (including the first similarity threshold value and the second similarity threshold value) may be equal or unequal. Here. "first" and "second" are merely used to distinguish the similarity threshold values, and do not constitute a special limitation to the present disclosure. In addition, a similarity may generally represent a degree of similarity between video frames. It may be appreciated that, based on the same concept, the scheme of calculating a similarity may be converted into a scheme of calculating a dissimilarity. Therefore, both the scheme of calculating the similarity and the scheme of calculating the dissimilarity shall fall within the scope of protection of the technical solution as claimed in the present disclosure.

It may be appreciated that the final video clip set obtained by performing the combination processing on the video clips in the video clip set may include a shot and a shot boundary. Thus, it is implemented that the to-be-segmented video is segmented into the shot and the shot boundary, the accuracy and robustness of the segmentation for the video are improved, and the approach of segmenting the video is enriched.

Figure 5:
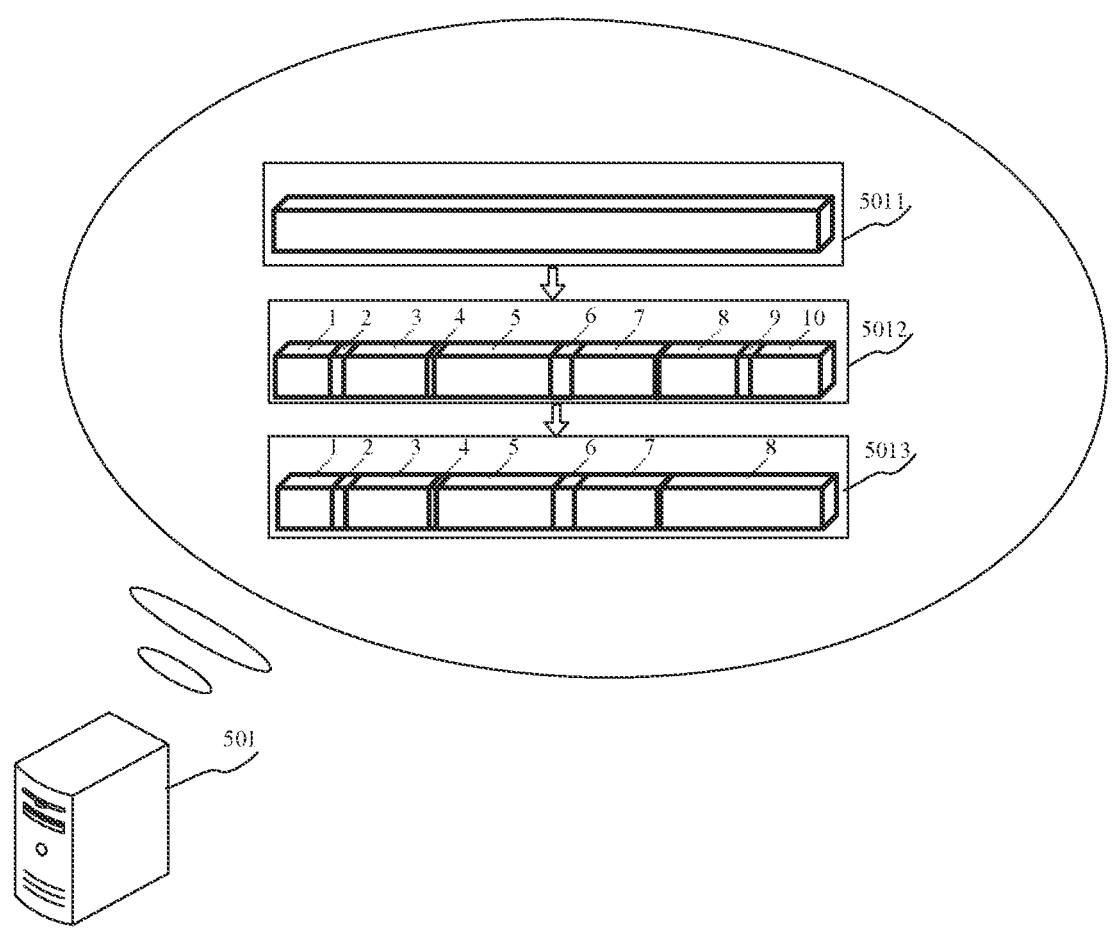
FIG. 5 is a schematic diagram of an application scenario of a method for segmenting a video according to embodiments of the present disclosure.

Further referring to FIG. 5, FIG. 5 is a schematic diagram of an application scenario of the method for segmenting a video according to this embodiment. In the application scenario of FIG. 5, a server 501 first acquires a to-be-segmented video 5011. Afterwards, the server 501 performs video shot segmentation on the to-be-segmented video 5011 to obtain an initial video clip set 5012. Here, the video clip set 5012 includes video clips 1-10. Then, the server 501 selects at least one video clip from the video clip set 5012. Here, the server 501 selects the video clip 2 and the video clip 9. Next, for each video clip in the video clip 2 and the video clip 9, the server 501 determines a semantic similarity between two video clips adjacent to the video clip. For example, for the video clip 2, the server 501 determines the semantic similarity between the video clip 1 and the video clip 3. For the video clip 9, the server 501 determines the semantic similarity between the video clip 8 and the video clip 10. Next, the server 501 performs combination processing on each video clip in the video clip set 5012, the combination processing includes: combining, for a semantic similarity in the determined semantic similarities, two video clips corresponding to the semantic similarity and a video clip between the two video clips corresponding to the semantic similarity, in response to determining that the semantic similarity is greater than a preset first similarity threshold value (e.g., 0.8). Accordingly, a final video clip set 5013 is obtained. Here, the video clip set 5013 includes the video clips 1-8. Here, the video clip 8 included in the final video clip set 5013 is obtained by combining the video clips 8-10 included in the initial video clip set 5012.

According to the method provided in the embodiment of the present disclosure, the video shot segmentation is first performed on the to-be-segmented video, and then the video clips in the to-be-segmented video after the segmentation are combined. Thus, the accuracy and robustness of the video shot segmentation are improved, and the approach of segmenting the video is enriched, which is conductive to improving the efficiency of the segmentation for the video.

Figure 6:
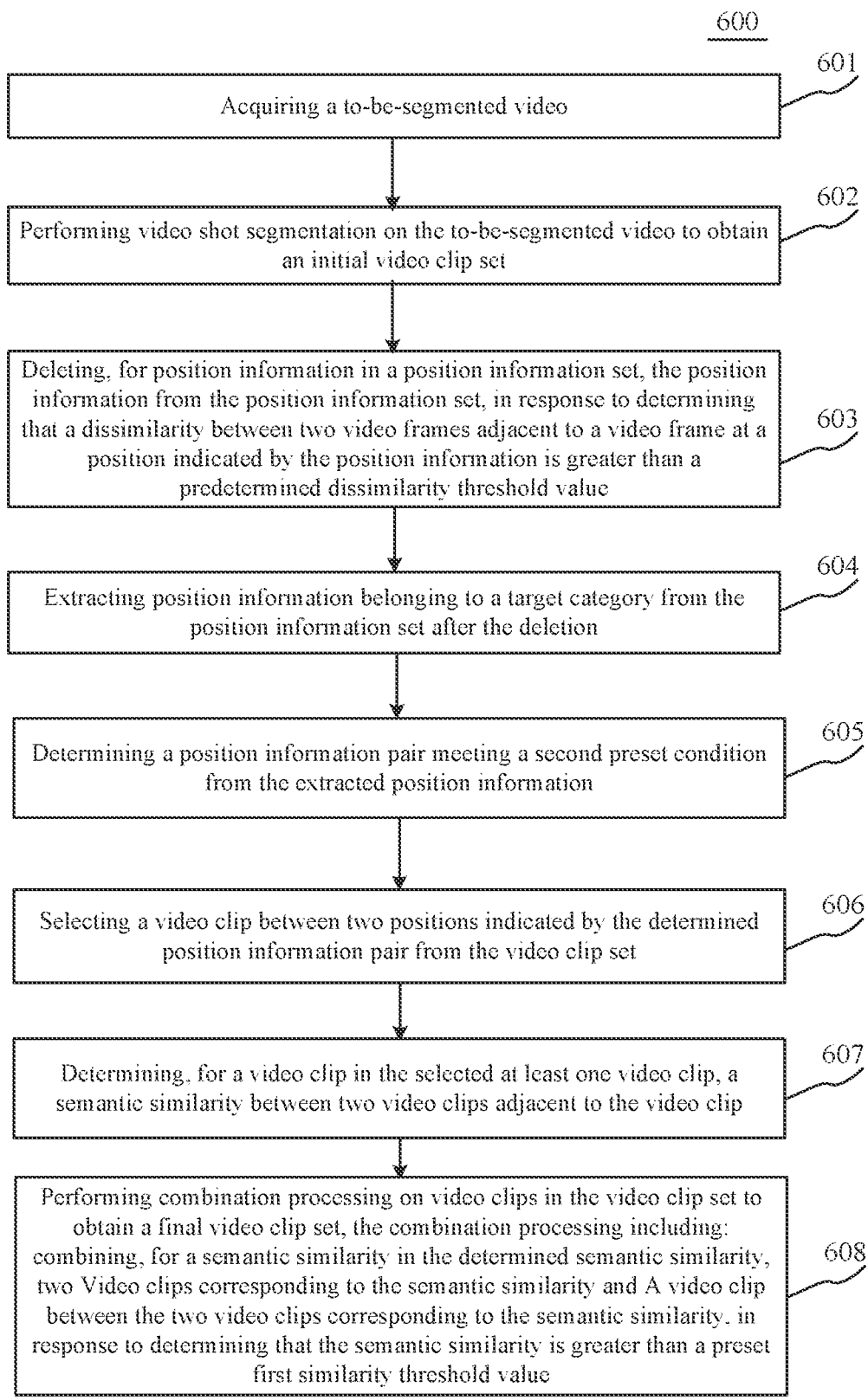
FIG. 6 is a flowchart of another embodiment of the method for segmenting a video according to embodiments of the present disclosure.

Further referring to FIG. 6, FIG. 6 illustrates a flow 600 of another embodiment of the method for segmenting a video. The flow 600 of the method for segmenting a video includes the following steps.

Step 601, acquiring a to-be-segmented video.

In this embodiment, step 601 is substantially the same as step 201 in the embodiment corresponding to FIG. 2, which will not be repeatedly described here.

Step 602, performing video shot segmentation on the to-be-segmented video to obtain an initial video clip set.

In this embodiment, step 602 is substantially the same as step 202 in the embodiment corresponding to FIG. 2, which will not be repeatedly described here.

Step 603, deleting, for position information in a position information set, the position information from the position information set, in response to determining that a dissimilarity between two video frames adjacent to a video frame at a position indicated by the position information is greater than a predetermined dissimilarity threshold value.

In this embodiment, for the position information in the position information set, an executing body (e.g., the server or the terminal devices shown in FIG. 1) of the method for segmenting a video may delete the position information from the position information set in the situation where it is determined that the dissimilarity between the two video frames adjacent to the video frame at the position indicated by the position information is greater than the predetermined dissimilarity threshold value.

Here, the position information in the position information set may be position information of a position between two adjacent video clips in the initial video clip set. It may be appreciated that the initial video clip set may be obtained by segmenting the to-be-segmented video at a position indicated by each piece of position information in the position information set.

The dissimilarity threshold value may be a numerical value preset by a technician. For example, when the dissimilarity is represented by a numerical value between 0 and 1, and the larger the numerical value is, the higher the represented dissimilarity is, the dissimilarity threshold value may be 0.04, 0.05, or the like.

It may be appreciated that incorrectly detected position information may be eliminated from the position information set to a certain extent in the first step. A dissimilarity corresponding to a video frame at a position indicated by the incorrectly detected position information is less than the dissimilarity threshold value, which may indicate that the possibility that the video frame at the position belongs to a shot boundary is small. Accordingly, it helps to improve the accuracy of determining the position of the shot boundary, which is conductive to improving the accuracy of the segmentation for the video.

In some usage situations, the dissimilarity threshold value may be determined by the technician, the executing body or an other electronic device communicated with the executing body through the following steps.

First, dissimilarities corresponding to video frames included in the to-be-segmented video are sorted in an ascending order to obtain a dissimilarity sequence.

Then, a dissimilarity corresponding to a video frame at a predetermined position (e.g., the fourth quintile point, and the fifth seven equal diversion point) is selected from an end of the minimum (or maximum) dissimilarity in the dissimilarity sequence as the dissimilarity threshold value. For example, the executing body may divide the dissimilarity sequence into two parts, one part including 80% of the number of dissimilarities included in the dissimilarity sequence, and the other part including 20% of the number of the dissimilarities included in the dissimilarity sequence. Here, the minimum dissimilarity included in the dissimilarity sequence is contained in the part including 80% of the number of the dissimilarities included in the dissimilarity sequence. Accordingly, the maximum similarity in the part including the minimum dissimilarity may be determined as the dissimilanty threshold value.

Step 604, extracting position information belonging to a target category from the position information set after the deletion.

In this embodiment, the executing body may extract the position information belonging to the target category from the position information set after the deletion.

Here, the position information in the position information set may be divided into an abrupt change category and a gradual change category. The target category may refer to the gradual change category.

Specifically, the executing body may determine a category of position information according to the following steps.

In a first step, position information of the positions of the first video frame and the last video frame included in the to-be-segmented video is determined as position information of the abrupt change category.

In a second step, for each video frame in video frames from the second video frame included in the to-be-segmented video to the next-to-last video frame (i.e., a previous video frame of a last video frame) included in the to-be-segmented video, a difference value between a dissimilarity corresponding to the video frame and a dissimilarity corresponding to a previous video frame of the video frame is determined as a first difference value of the video frame, and a difference value between the dissimilarity corresponding to the video frame and a dissimilarity corresponding to a next video frame of the video frame is determined as a second difference value of the video frame. A larger difference value in the first difference value of the video frame and the second difference value of the video frame is determined as a large difference value of the video frame, and a smaller difference value in the first difference value of the video frame and the second difference value of the video frame is determined as a small difference value of the video frame. If the video frame satisfies a predetermined abrupt change condition, position information of the position of the video frame is determined as position information of the abrupt change category; otherwise, the position information of the position of the video frame is determined as position information of the gradual change category.

The abrupt change condition may include at least one of, the small difference value of the video frame being greater than or equal to a first predetermined numerical value (e.g., 0.1 or 0.015), the quotient of the small difference value of the video frame and the large difference value of the video frame being greater than or equal to a second predetermined numerical value (e.g., 0.80 or 0.075), or the small difference value of the video frame being less than or equal to a third predetermined numerical value.

It may be appreciated that the position information of the gradual change category and the position information of the abrupt change category may be obtained here, and on this basis, an abruptly changed shot boundary and a gradually changed shot boundary may be further obtained, thereby obtaining a shot included in the to-be-segmented video. For example, the to-be-segmented video includes 1000 video frames, the position information of the abrupt change category represents that the position of the 110-th frame in the to-be-segmented video is an abruptly changed shot boundary, and the position information of the gradual change category represents that the positions of the 660-th frame to the 700-th frame in the to-be-segmented video are gradually changed shot boundaries. Therefore, it may be determined that the shot included in the to-be-segmented video includes a video clip including the first video frame to the 109-th video frame, a video clip including the 111-th video frame to the 659-th video frame, and a video clip including the 701-th video frame to the 1000-th video frame.

Here, the first predetermined numerical value, the second predetermined numerical value, and the third predetermined numerical value may be preset numerical values, and the predetermined numerical values (including the first predetermined numerical value, the second predetermined numerical value and the third predetermined numerical value) may be equal or unequal. Here, "first," "second" and "third" are merely used to distinguish the predetermined numerical values, and do not constitute a special limitation to the present disclosure.

It should be noted that, as compared with the existing technology, determining the position information of the gradual change category and the position information of the abrupt change category through the method may improve the speed of the determination for the gradually changed shot boundary and the abruptly changed shot boundary.

Step 605, determining a position information pair meeting a second preset condition from the extracted position information.

In this embodiment, the position information pair here may be composed of position information of positions of two video frames.

The second preset condition may be a condition preset by the technician. Video frames between the two video frames corresponding to the position information pair obtained through the second preset condition may constitute a shot.

As an example, a larger similarity in two dissimilarities corresponding to positions respectively indicated by two pieces of position information included in the position information pair is determined as a large similarity of the position information pair, and a smaller similarity is determined as a small similarity of the position information pair. The minimum similarity in dissimilarities corresponding to positions indicated by all pieces of extracted position information is determined as a minimum similarity of the position information pair, and the sum of the small similarity of the position information pair and the large similarity of the position information pair is determined as a sum of similarities of the position information pair. On this basis, the second preset condition may include the following four items (i.e., if the first item, the second item, the third item and the fourth item are all satisfied, the second preset condition is satisfied).

First item: the number of video frames included between the video frames at the positions respectively indicated by the two pieces of position information included in the position information pair is less than or equal to the third predetermined numerical value (e.g., 1).

Second item: the difference value between a dissimilarity corresponding to a latter piece of position information included in the position information pair and a dissimilarity corresponding to a former piece of position information included in the position information pair is less than or equal to a fourth predetermined numerical value (e.g., 5).

Third item: the quotient of the small similarity of the position information pair and the large similarity of the position information pair is greater than or equal to a fifth predetermined numerical value (e.g., 0.6).

Fourth item: the quotient of the minimum similarity of the position information pair and the sum of the similarities of the position information pair is greater than or equal to a sixth predetermined numerical value (e.g., 0.3).

It should be noted that the first predetermined numerical value, the second predetermined numerical value, the third predetermined numerical value, the fourth predetermined numerical value, the fifth predetermined numerical value and the sixth predetermined numerical value may be numerical values respectively predetermined by the technician, and the predetermined numerical values (including the first predetermined numerical value, the second predetermined numerical value, the third predetermined numerical value, the fourth predetermined numerical value, the fifth predetermined numerical value and the sixth predetermined numerical value) may be equal or unequal. Here, "first." "second," "third," "fourth." "fifth" and "sixth" are merely used to distinguish the predetermined numerical values, and do not constitute a special limitation to the present disclosure.

Step 606, selecting a video clip between two positions indicated by the determined position information pair from the video clip set.

In this embodiment, the executing body may select the video clip between the two positions indicated by the determined position information pair from the video clip set.

It may be appreciated that the video clip set may be obtained by segmenting the to-be-segmented video by the executing body according to a position indicated by position information in the position information set, and when the position information set changes (e.g., position information is added to or deleted from the position information set), the video clip included in the video clip set changes accordingly, and thus, the video clip between the two positions indicated by the determined position information pair is included in the video clip set.

It may be appreciated that a video clip between two video frames corresponding to position information included in a position information pair of the target category may be obtained through the step, and the obtained video clip may refer to a gradually changed shot boundary for separating shots. Accordingly, the obtained gradually changed shot boundary is conductive to improving the accuracy of the segmentation for the video.

Step 607, determining, for a video clip in at least one video clip, a semantic similarity between two video clips adjacent to the video clip.

In this embodiment, step 607 is substantially the same as "determining, for a video clip in the at least one video clip, a semantic similarity between two video clips adjacent to the video clip" in step 203 in the embodiment corresponding to FIG. 2, which will not be repeatedly described here.

Step 608, performing combination processing on video clips in the video clip set to obtain a final video clip set, the combination processing includes: combining, for a semantic similarity in the determined semantic similarities, two video clips corresponding to the semantic similarity and a video clip between the two video clips corresponding to the semantic similarity, in response to determining that the semantic similarity is greater than a preset first similarity threshold value.

In this embodiment, step 608 is substantially the same as step 204 in the embodiment corresponding to FIG. 2, which will not be repeatedly described here.

It may be seen from FIG. 6 that, as compared with the embodiment corresponding to FIG. 2, the flow 600 of the method for segmenting a video in this embodiment emphasizes the step of selecting the at least one video clip from the video clip set. Accordingly, according to the scheme described in this embodiment, the video clip may be selected from the video clip set in more ways, thereby further enriching the approach of segmenting the video, and further improving the accuracy and efficiency of the segmentation for the video. □

Figure 7:
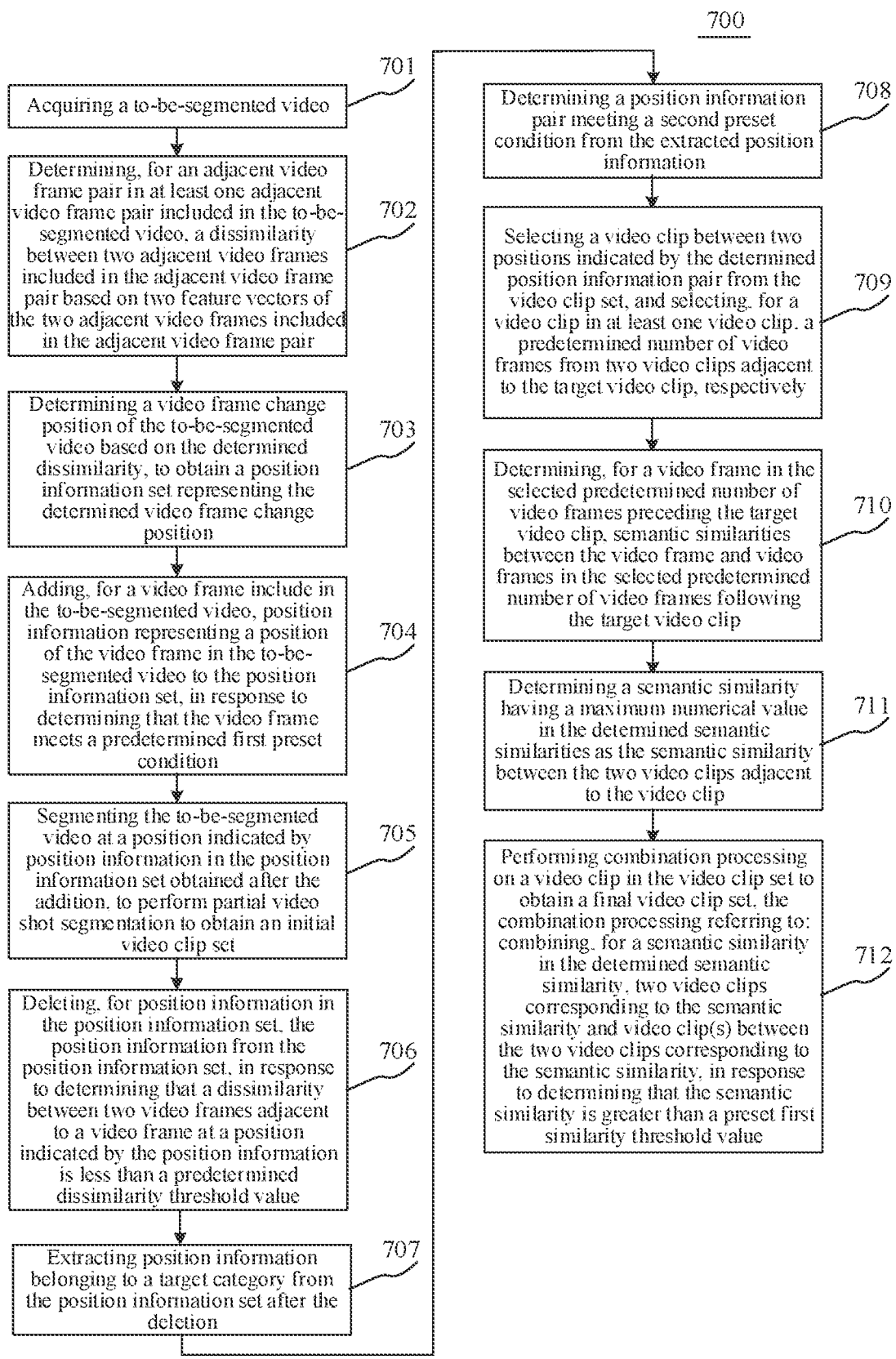
FIG. 7 is a flowchart of another embodiment of the method for segmenting a video according to embodiments of the present disclosure.

Further referring to FIG. 7, FIG. 7 illustrates a flow 700 of another embodiment of the method for segmenting a video. The flow 700 of the method for segmenting a video includes the following steps.

Step 701, acquiring a to-be-segmented video.

In this embodiment, step 701 is substantially the same as step 201 in the embodiment corresponding to FIG. 2, which will not be repeatedly described here.

Step 702, determining, for an adjacent video frame pair in at least one adjacent video frame pair included in the to-be-segmented video, a dissimilarity between two adjacent video frames included in the adjacent video frame pair based on two feature vectors of the two adjacent video frames included in the adjacent video frame pair.

In this embodiment, for the adjacent video frame pair in the at least one adjacent video frame pair included in the to-be-segmented video, an executing body (e.g., the server or the terminal devices shown in FIG. 1) of the method for segmenting a video may determine the dissimilarity between the two adjacent video frames included in the adjacent video frame pair based on the two feature vectors of the two adjacent video frames included in the adjacent video frame pair.

The adjacent video frame pair may refer to two adjacent video frames included in the to-be-segmented video. As an example, it is assumed that the to-be-segmented video includes a video frame 1, a video frame 2 and a video frame 3. The adjacent video frame pair included in the to-be-segmented video may refer to any of: the video frame 1 and the video frame 2, or the video frame 2 and the video frame 3.

The feature vector may be used to represent a feature (e.g., a color feature and a texture feature) of a video frame. The method of extracting a feature vector of a video frame may be various feature vector extraction methods existing or now unknown but proposed in the future, for example, a color histogram or a histogram of oriented gradient (HOG).

As an example, for each adjacent video frame pair in the at least one adjacent video frame pair included in the to-be-segmented video, the executing body may determine a dissimilarity between two adjacent video frames included in the adjacent video frame pair based on two feature vectors of the two adjacent video frames included in the adjacent video frame pair. The dissimilarity between two adjacent video frames included in each adjacent video frame pair included in the to-be-segmented video is thus obtained. For example, it is assumed that the to-be-segmented video includes a video frame 1, a video frame 2, a video frame 3 and a video frame 4. The executing body may determine that all adjacent video frame pairs included in the to-be-segmented video include: an adjacent video frame pair consisting of the video frame 1 and the video frame 2, an adjacent video frame pair consisting of the video frame 2 and the video frame 3, and an adjacent video frame pair consisting of the video frame 3 and the video frame 4. Accordingly, the executing body may calculate the dissimilarity between the video frame 1 and the video frame 2, the dissimilarity between the video frame 2 and the video frame 3, and the dissimilarity between the video frame 3 and the video frame 4, respectively.

Here, the to-be-segmented video may be regarded as a video sequence $V=\{I_i|i=1, \ldots, N\}$. Here, V represents a video sequence, $I_i$ may identify a video image, and N represents the number of video images included in the video sequence). Thus, the to-be-segmented video may be segmented into a plurality of shots $S=\{S_t|t=1, \ldots, T\}$ having different lengths according to a change of a video scene. Here, S may represent a shot, $S_t$ may be used to identify a video frame image, and T may be used to represent the number of video frame images included in the shot). Each shot may be a video scene having consecutive content, which consists of video frame images of consecutive time, and may be represented by a 2-tuple $S_t=(ss_t, se_t)$. Here, $S_t$ may be used to identify a video frame image, $ss_t$ may represent a start video frame index of a shot, and set may represent an end video frame index.

Boundaries between shots (shot boundaries) may be divided into an abruptly changed shot boundary and a gradually changed shot boundary. The abruptly changed shot boundary does not contain a video image. A set of all shot boundaries may be represented as $B=\{B_k|k=1, \ldots, K\}$. Here, B may represent a shot boundary set, $B_k$ may represent a shot boundary, k may be used to identify the shot boundary, and K may represent the number of shot boundaries in the shot boundary set. Here, the shot boundary may be represented by a triplet, for example, may be represented as $B_k=(bs_k, be_k, bt_k)$. Here, $bs_k$ may represent a start video frame index of the shot boundary, $be_k$ may represent an end video frame index of the shot boundary, and $bt_k$ may represent a boundary type of the shot boundary. Here, $bt_k$ may represent an abrupt change type when $bt_k=1$, and $bt_k$ may represent a gradual change type when $bt_k=2$. The interval of video frame indexes included in the shot boundary is $[bs_k, be_k]$. Since the abruptly changed shot boundary does not contain any video image, $bs_k=be_k+1$.

Specifically, the executing body may perform step 702 according to the following steps.

First, a feature vector (color histogram) of a video image is calculated.

The color histogram may use two color spaces RGB (red, green and blue) and Lab (color model), which have a total of six color components, and each color component is quantified to 32 BINs (BINarys), such that the feature vector of a color histogram is 192 dimensions, and the color histogram set of all video images $V=\{I_i|i=1, \ldots, N\}$ is $H=\{H_i|i=1, \ldots, N\}$. Here, H represents the color histogram set, $H_i$ may be used to identify the color histograms, and $H_i$ represents the color histogram corresponding to $I_i$.

Then, a feature dissimilarity between adjacent video frames is calculated.

A dissimilarity set $D=\{d_i|i=1, \ldots, N\}$ between consecutive video frames is calculated using the color histogram set H of the images. Here, D represents the dissimilarity set between the consecutive video frames, $d_i$ represents a dissimilarity between the consecutive video frames, i may be used to identify the dissimilarity, and N may be used to represent the number of dissimilarities included in the dissimilarity set between the consecutive video frames. Here, there are many methods of calculating a dissimilarity, for example, a normalized correlation based method $$d(H_i, H_{i'}) = 1 - \frac{H_i^T H_{i'}}{\|H_i\|_2 \|H_{i'}\|_2},$$

and a histogram cross kernel based method $$d(H_i, H_{i'}) = 1 - \frac{\sum_{k=1}^{192} \min(H_{ik}, H_{ik'})}{\|H_i\|_1 \|H_{i'}\|_1}.$$

All the methods have good effects.

Here, it should be noted that only the dissimilarity between adjacent video frames is calculated, and thus, in the calculation formula i-i'=$N_{cons}$, where $N_{cons}$ is a settable parameter, and the value range thereof may be from 1 to 3. The larger the value is, the larger the overall mean dissimilarity is, and the good effect can be generally obtained when the value is 2.

Step 703, determining a video frame change position of the to-be-segmented video based on the determined dissimilarity, to obtain a position information set representing the determined video frame change position.

In this embodiment, the executing body may determine the video frame change position of the to-be-segmented video based on the determined dissimilarity, to obtain the position information set representing the determined video frame change position.

The video frame change position may be a position of a video frame meeting a preset condition and included in the to-be-segmented video. The preset condition may refer to that the dissimilarity between the video frame and a next video frame (or a previous video frame) of the video frame is greater than a preset dissimilarity threshold value. The video frame change position may alternatively be determined according to a predetermined method. The preset condition may alternatively refer to that the dissimilarity between the video frame and the next video frame (or the previous video frame) of the video frame is greater than the product of the maximum dissimilarity in the determined dissimilarities and a predetermined numerical value (e.g., 0.8).

The video frame change position may alternatively be obtained according to a predetermined method. The predetermined method may be a kernel temporal segmentation (KTS) method. An input parameter of the KTS method is the number of segmented shots, and a parameter is set to represent a mean number of video frames of each shot, such that the number of the segmented shots and the set parameter satisfy the following formula:

$$N\_(\max\_shots) = \lfloor N/N\_(mean\_stime) \rfloor.$$

Here, N_(max_shots) represents the number of the segmented shots, N_(mean_stime) represents the mean number of the video frames of the each shot, N is a number of video frames of the to-be-segmented video, and the symbol "⌊ ⌋" represents rounding down. It may be appreciated that rounding down is performed on the ratio of the number of the video frames of the to-be-segmented video to the mean number of the video frames of the each shot, and thus, the number of the segmented shots may be obtained. Since more video frame change positions are to be detected using the KTS method so as to perform a partial video shot segmentation on the video, N_(mean_stime) may be set to a relatively small value, for example, the value range of N_(mean_stime) may be from 10 to 30.

Step 704, adding, for a video frame include in the to-be-segmented video, position information representing a position of the video frame in the to-be-segmented video to the position information set, in response to determining that the video frame meets a predetermined first preset condition.

In this embodiment, for the video frame include in the to-be-segmented video, the executing body may add the position information representing the position of the video frame in the to-be-segmented video to the position information set, in response to determining that the video frame meets the predetermined first preset condition.

Here, the first preset condition may be a condition preset by a technician. For example, the first preset condition may refer to a video frame of which the similarity to a video frame at a position indicated by position information in the video frame change position (the position information set before the addition) is greater than a preset threshold value.

As an example, the executing body may perform the addition on the position information set according to the following steps.

First, the executing body may calculate, for each video frame, whether a dissimilarity corresponding to a next video frame of the video frame is greater than or equal to a dissimilarity corresponding to the video frame, where the calculation starts from the first video frame included in the to-be-segmented video, and goes backwards in sequence until the next-to-last video frame (i.e., a previous frame of the last frame) included in the to-be-segmented video. If the dissimilarity corresponding to the next video frame of the video frame is greater than or equal to the dissimilarity corresponding to the video frame, and position information of a position (a position of the video frame in the to-be-segmented video) of the video frame belongs to the position information set (the position information set before the addition), position information of a position of the next video frame of the video frame is added to the position information set (the position information set before the addition).

Then, the executing body may calculate, for each video frame, whether a dissimilarity corresponding to the video frame is greater than or equal to a dissimilarity corresponding to a next video frame of the video frame, where the calculation starts from the next-to-last video frame (i.e., the previous frame of the last frame) included in the to-be-segmented video, and goes forwards in sequence until the first video frame included in the to-be-segmented video. If the dissimilarity corresponding to the video frame is greater than or equal to the dissimilarity corresponding to the next video frame of the video frame, and position information of a position (a position of the next video frame of the video frame in the to-be-segmented video) of the next video frame of the video frame belongs to the position information set (the position information set before the addition), position information of a position of the video frame is added to the position information set (the position information set before the addition).

Accordingly, the position information set obtained after the addition is obtained. The expanded position information set is a union of the two position information sets obtained after the two additions.

Step 705, segmenting the to-be-segmented video at a position indicated by position information in the position information set obtained after the addition, to perform partial video shot segmentation to obtain an initial video clip set.

In this embodiment, the executing body may segment the to-be-segmented video at the position indicated by the position information in the position information set obtained after the addition, to perform the partial video shot segmentation to obtain the initial video clip set.

It may be appreciated that, by segmenting the to-be-segmented video at the position indicated by the position information in the position information set obtained after the addition to perform the partial video shot segmentation, the initial video clip set described in step 705 may be obtained.

Step 706, deleting, for position information in the position information set, the position information from the position information set, in response to determining that a dissimilarity between two video frames adjacent to a video frame at a position indicated by the position information is less than a predetermined dissimilarity threshold value.

In this embodiment, for the position information in the position information set, the executing body may delete the position information from the position information set, in response to determining that the dissimilarity between the two video frames adjacent to the video frame at the position indicated by the position information is less than the predetermined dissimilarity threshold value.

The position information set may be the position information set obtained after the addition, or may be the position information set (i.e., the position information set obtained in the first sub-step) before the addition that represents the determined video frame change position.

The dissimilarity threshold value may be a numerical value preset by the technician. For example, when the dissimilarity is represented by a numerical value between 0 and 1, and the larger the numerical value is, the higher the represented dissimilarity is, the dissimilarity threshold value may be 0.04, 0.05, or the like.

It may be appreciated that incorrectly detected position information may be eliminated from the position information set to a certain extent in step 706. A dissimilarity corresponding to a video frame at a position indicated by the incorrectly detected position information is less than the dissimilarity threshold value, which may indicate that the possibility that the video frame at the position belongs to a shot boundary is small. Accordingly, it helps to improve the accuracy of determining the position of the shot boundary, which is conductive to improving the accuracy of the segmentation for the video.

In some usage situations, the dissimilarity threshold value may be determined by the technician, the executing body or an other electronic device communicated with the executing body through the following steps.

First, dissimilarities corresponding to video frames included in the to-be-segmented video are sorted in an ascending order to obtain a dissimilarity sequence.

Then, a dissimilarity corresponding to a video frame at a predetermined position (e.g., the fourth quintile point, and the fifth seven equal diversion point) is selected from an end of the minimum (or maximum) dissimilarity in the dissimilarity sequence as the dissimilarity threshold value. For example, the executing body may divide the dissimilarity sequence into two parts, one part including 80% of the number of dissimilarities included in the dissimilarity sequence, and the other part including 20% of the number of the dissimilarities included in the dissimilarity sequence. Here, the minimum dissimilarity included in the dissimilarity sequence is contained in the part including 80% of the number of the dissimilarities included in the dissimilarity sequence. Accordingly, the maximum similarity in the part including the minimum dissimilarity may be determined as the dissimilarity threshold value.

It may be appreciated that, by determining the maximum similarity in the part including the minimum dissimilarity as the dissimilarity threshold value, an error in setting the dissimilarity threshold value subjectively may be avoided to a certain extent. On this basis, the accuracy of the segmentation for the video may be further improved by performing the subsequent steps in this embodiment.

Alternatively, the dissimilarity threshold value may also be determined by the technician, the executing body or the other electronic device communicated with the executing body through the following steps.

First, a mean value of the dissimilarities corresponding to the video frames included in the to-be-segmented video is determined.

Then, the product of the obtained mean value and a predetermined numerical value (e.g., 1 or 0.9) is determined as the dissimilarity threshold value.

Specifically, numerical values in a dissimilarity set $D=\{d_i|i=1,\ldots,N\}$ of the consecutive frames in the video are sorted in an ascending order, to obtain a sorted set $SD=\{sd_i|i=1,\ldots,N\}$. Here, SD represents the set obtained after the dissimilarity set of the consecutive frames in the video is sorted, $sd_i$ represents an element (i.e., the value of a dissimilarity) in the sorted set, i may be used to identify the element in the sorted set, and N may represent the number of elements in the sorted set. Then, a dissimilarity value $sd_i$ of 80% of quantiles of the sorted set is used as a threshold value $th\_simi_{global}$. If a dissimilarity value di of an adjacent frame of a time domain change point $cp_c$ is less than $th\_simi_{global}$, the time domain change point $cp_c$ is filtered out. Through this method, most of incorrectly detected time domain change points may be filtered out.

Step 707, extracting position information belonging to a target category from the position information set after the deletion.

In this embodiment, the executing body may extract the position information belonging to the target category from the position information set after the deletion.

Here, the position information in the position information set may be divided into an abrupt change category and a gradual change category. The target category may refer to the gradual change category.

Specifically, the executing body may determine a category of position information according to the following steps.

In a first step, position information of positions of the first video frame and the last video frame included in the to-be-segmented video is determined as position information of the abrupt change category.

In a second step, for each video frame in video frames from the second video frame included in the to-be-segmented video to the next-to-last video frame (i.e., the previous video frame of the last video frame) included in the to-be-segmented video, a difference value between a dissimilarity corresponding to the video frame and a dissimilarity corresponding to a previous video frame of the video frame is determined as a first difference value of the video frame, and a difference value between the dissimilarity corresponding to the video frame and a dissimilarity corresponding to a next video frame of the video frame is determined as a second difference value of the video frame. A larger difference value in the first difference value of the video frame and the second difference value of the video frame is determined as a large difference value of the video frame, and a smaller difference value in the first difference value of the video frame and the second difference value of the video frame is determined as a small difference value of the video frame. If the video frame satisfies a predetermined abrupt change condition, position information of the position of the video frame is determined as position information of the abrupt change category; otherwise, the position information of the position of the video frame is determined as position information of the gradual change category.

The abrupt change condition may include at least one of: the small difference value of the video frame being greater than or equal to a first predetermined numerical value (e.g., 0.1 or 0.015), the quotient of the small difference value of the video frame and the large difference value of the video frame being greater than or equal to a second predetermined numerical value (e.g., 0.80 or 0.075), or the small difference value of the video frame being less than or equal to the third predetermined numerical value.

It may be appreciated that the position information of the gradual change category and the position information of the abrupt change category may be obtained here, and on this basis, an abruptly changed shot boundary and a gradually changed shot boundary may be further obtained, thereby obtaining a shot included in the to-be-segmented video. For example, the to-be-segmented video includes 1000 video frames, the position information of the abrupt change category represents that the position of the 110-th frame in the to-be-segmented video is an abruptly changed shot boundary, and the position information of the gradual change category represents that the positions of the 660-th frame to the 700-th frame in the to-be-segmented video are gradually changed shot boundaries. Therefore, it may be determined that the shot included in the to-be-segmented video includes a video clip including a first video frame to the 109-th video frame, a video clip including the 111-th video frame to the 659-th video frame, and a video clip including the 701-th video frame to the 1000-th video frame.

Here, the first predetermined numerical value, the second predetermined numerical value, and the third predetermined numerical value may be preset numerical values, and the predetermined numerical values (including the first predetermined numerical value, the second predetermined numerical value and the third predetermined numerical value) may be equal or unequal. Here, "first," "second" and "third" are merely used to distinguish the predetermined numerical values, and do not constitute a special limitation to the present disclosure.

It should be noted that, as compared with the existing technology, determining the position information of the gradual change category and the position information of the abrupt change category through the method may improve the speed of the determination for the gradually changed shot boundary and the abruptly changed shot boundary.

Specifically, the executing body may perform step 707 according to the following steps.

The dissimilarity value of the adjacent frame of the time domain change point $cp_c$ is recorded as $d_i$, dissimilarity values of adjacent frames of a previous frame and a next frame of the time domain change point are respectively recorded as $d_{i-1}$ and $d_{i+1}$, $d_p = d_i - d_{i-1}$, $d_n = d_i - d_{i+1}$, $d_{min} = \min(d_p, d_n)$ and $d_{max} = \max(d_p, d_n)$ are calculated. If the condition (e.g., $d_{min} \geq 0.1$, $d_{min}/d_{max} \geq 0.8$, and $\min(d_{i-1}, d_{i+1}) \leq 0.1$) is satisfied, the time domain change point is an abrupt change point, otherwise, the time domain change point is a gradual change point.

For the abrupt change point, it may be immediately used to form an abruptly changed shot boundary $B_k = (cp_c, cp_c-1, 1)$. For the gradual change point, it is processed in the next step to form a gradually changed shot boundary.

It should be noted that the gradual change point may belong to the gradual change category, i.e., the target category. In this step, time domain change points may be divided into an abrupt change point (i.e., a non-target category) and a gradual change point (i.e., the target category).

Step 708, determining a position information pair meeting a second preset condition from the extracted position information.

In this embodiment, the executing body may determine, from the extracted position information, the position information pair meeting the second preset condition.

Here, the position information pair here may be composed of position information of positions of two video frames.

The second preset condition may be a condition preset by the technician. Video frames between the two video frames corresponding to the position information pair obtained through the second preset condition may constitute a shot.

As an example, a larger similarity in two dissimilarities corresponding to positions respectively indicated by two pieces of position information included in the position information pair is determined as a large similarity of the position information pair, and a smaller similarity is determined as a small similarity of the position information pair. The minimum similarity in dissimilarities corresponding to positions indicated by all pieces of extracted position information is determined as a minimum similarity of the position information pair, and the sum of the small similarity of the position information pair and the large similarity of the position information pair is determined as a sum of similarities of the position information pair. On this basis, the second preset condition may include the following items.

First item: the number of video frames included between the video frames at the positions respectively indicated by the two pieces of position information included in the position information pair is less than or equal to the third predetermined numerical value (e.g., 1).

Second item: the difference value between a dissimilarity corresponding to a latter piece of position information included in the position information pair and a dissimilarity corresponding to a former piece of position information included in the position information pair is less than or equal to a fourth predetermined numerical value (e.g., 5).

Third item: the quotient of the small similarity of the position information pair and the large similarity of the position information pair is greater than or equal to a fifth predetermined numerical value (e.g., 0.6).

Fourth item: the quotient of the minimum similarity of the position information pair and the sum of the similarities of the position information pair is greater than or equal to a sixth predetermined numerical value (e.g., 0.3).

It should be noted that the first predetermined numerical value, the second predetermined numerical value, the third predetermined numerical value, the fourth predetermined numerical value, the fifth predetermined numerical value and the sixth predetermined numerical value may be numerical values respectively predetermined by the technician, and the predetermined numerical values (including the first predetermined numerical value, the second predetermined numerical value, the third predetermined numerical value, the fourth predetermined numerical value, the fifth predetermined numerical value and the sixth predetermined numerical value) may be equal or unequal. Here, "first," "second," "third," "fourth," "fifth" and "sixth" are merely used to distinguish the predetermined numerical values, and do not constitute a special limitation to the present disclosure.

The gradually changed shot boundary has a certain width, and generally includes a plurality of gradual change points. First, it is required to combine adjacent gradual change points satisfying a certain condition into a group. Then, the starting and ending positions of the gradually changed shot boundary are obtained from the first point and the last point in a chronological order in the group of gradual change points.

Adjacent gradual change points $cp_c$ ($cp_c$ is a video frame index of a change point) and $cp_{c+1}$ (the next gradual change point of the gradual change point $cp_c$) are combined into a group if the adjacent gradual change points satisfy one of the following conditions.

Condition 1: $cp_{c+1} - cp_c \leq 2$.

Condition 2: The dissimilarity values of the gradual change points are set to $d_s = d_{cpc}$ and $d_c = d_{cpc+1}$, and $d_{min} = \min(d_s, d_c)$, $d_{max}(d_s, d_c)$ and $d_c = \min\{d_i | i = cp_c, \ldots, cp_{c+1}\}$ are calculated. If the condition (e.g., $cp_{c+1} - cp_c \leq 5$, $d_{min}/d_{max} \geq 0.6$, and $(d_c \times 2)/(d_{min} + d_{max}) \geq 0.6$) is satisfied, the gradual change points $cp_c$ and $cp_{c+1}$ are combined.

For the gradual change points combined into the group, the first gradual change point and the last gradual change point in the chronological order in the group are set to $cp_s$ and $cp_c$. If the number of the gradual change points in the group is at least 2, the gradually changed shot boundary formed by the group gradual change points is $B_k = (cp_s, cp_c - 1, 2)$. If there is only one gradual change point in the group, the gradually changed shot boundary would not be formed.

At this point, the abruptly changed shot boundary and the gradually changed shot boundary are sorted in a chronological order to obtain a shot boundary set $B = \{B_k | k=1, \ldots, k\}$ and $B_k = (bs_k, be_k, bt_k)$.

Step 709, selecting a video clip between two positions indicated by the determined position information pair from the video clip set, and selecting, for a video clip in at least one video clip, a predetermined number of video frames from two video clips adjacent to the target video clip, respectively.

In this embodiment, the executing body may select the video clip between the two positions indicated by the determined position information pair from the video clip set, and select, for the video clip in the at least one video clip, the predetermined number of video frames from the two video clips adjacent to the target video clip, respectively. Here, the predetermined number may be a predetermined number value (e.g., 1, 2, 3 and 4). The two video clips adjacent to the target video clip may be a video clip preceding and adjacent to the target video clip, and a video clip following and adjacent to the target video clip.

The selected video frames may be a predetermined number of video frames that are respectively selected from the two video clips and close to the target video clip, or may be a predetermined number of video frames that are randomly selected.

Specifically, the executing body may select an image in which both ends of a shot boundary belong to two video shots. For the shot boundary $B_k = (bs_k, be_k, bt_k)$, $N_b$ (representing the predetermined number) images $LI_k = \{I_i | i = bs_k - N_b, \ldots, bs_k - 1\}$ are selected at a video shot proximity boundary on the left side of the shot boundary, and $N_b$ images $RI_k = \{I_i | i = be_k + 1, \ldots, be_k + N_b\}$ are selected at a video shot proximity boundary on the right side of the shot boundary. Here, $N_b$ is a settable parameter, of which the value range is from 1 to 4. For example, the value of $N_b$ may be 2. Here, $LI_k$ may be used to represent the $N_b$ images on the left side, $I_i$ may be used to represent one image in the $N_b$ images, and $RI_k$ may be used to represent $N_b$ images on the right side.

Step 710, determining, for a video frame in the selected predetermined number of video frames preceding the target video clip, semantic similarities between the video frame and video frames in the selected predetermined number of video frames following the target video clip.

In this embodiment, for each video frame in the selected predetermined number of video frames preceding the target video clip, the executing body may determine a similarity between the video frame and each video frame in the selected predetermined number of video frames following the target video clip.

A deep learning based classification model has a very strong image classification capability and an embedded feature vector (feature embedding) of the model has a relatively strong semantic discrimination capability for images of different scenes and contents. Thus, the embedded feature vector of the selected image may be calculated using the deep learning based classification model (e.g., a convolutional network model such as a VGG, an Inception and a ResNet trained using an ImageNet data set), and the number of dimensions of the feature vector may be 1024. For an image set $LI_k$ of a left shot, the feature vector set thereof may be represented as $LX_k = \{LX_{k,j} | j=1, \ldots, N_b\}$. Also, for an image set $RI_k$ of a right shot, the feature vector set thereof may be represented as $RX_k = \{RX_{k,j} | j=1, \ldots, N_b\}$. Here, $LI_k$ represents the image set of the left shot, $LX_{k,j}$ may be used to represent each image in the image set of the left shot, j may be used to identify an image in the image set of the left shot, and $N_b$ may be used to represent the number of images in the image set of the left shot. $RI_k$ may be used to represent each image in the image set of the right shot. In this embodiment, the deep learning based classification model outputs the embedded feature vector of the image, and then, the semantic similarity between the images is calculated based on the embedded feature vector. Through this method, the influence of a non-scene change (e.g., an illumination change, or an intensive movement of a person or an object in a scene) on the semantic similarity between the images is eliminated.

Step 711, determining a semantic similarity having a maximum numerical value in the determined semantic similarities as the semantic similarity between the two video clips adjacent to the video clip.

In this embodiment, the executing body may determine the semantic similarity having the maximum numerical value in the determined semantic similarities as the semantic similarity between the two video clips adjacent to the video clip.

Specifically, the executing body may calculate a cosine similarity $simi_{j1,j2}=\varphi(LX_{k,j1}, RX_{k,j2})$ between any image pair of the left shot and the right shot by using the feature vector, to obtain a similarity set of an image pair, and use a maximum value $simi_{shot}=\max\{simi_{j1,j2}|j1=1, \ldots, N_b; j2=1, \ldots, N_b\}$ in the set as a similarity between the shots on the left and right sides of the boundary (i.e., the similarity between the two video clips adjacent to the video clip). Here, $simi_{j1,j2}$ represents a cosine similarity between an image pair of the left shot and the right shot (i.e., an image $LX_{k,j1}$ of the left shot and an image $RX_{k,j2}$ of the right shot), and $\varphi(LX_{k,j1}, RX_{k,j2})$ represents a calculation for the cosine similarity between the image $LX_{k,j1}$ of the left shot and the image $RX_{k,j2}$ of the right shot.

Step 712, performing combination processing on a video clip in the video clip set to obtain a final video clip set, the combination processing including: combining, for a semantic similarity in the determined semantic similarity, two video clips corresponding to the semantic similarity and video clip(s) between the two video clips corresponding to the semantic similarity, in response to determining that the semantic similarity is greater than a preset first similarity threshold value.

In this embodiment, step 712 is substantially the same as step 204 in the embodiment corresponding to FIG. 2, which will not be repeatedly described here.

It may be appreciated that, for an abruptly changed shot boundary, if a similarity $simi_{shot}$ between shots on the left and right sides of the boundary is greater than a threshold value $th\_simi_a$, it may be determined that the shot boundary is an incorrectly detected shot boundary. For a gradually changed shot boundary, if a similarity $simi_{shot}$ between shots on the left and right sides of the boundary is greater than a threshold value $th\_simi_g$, it may be determined that the shot boundary is an incorrectly detected shot boundary. The shot boundary determined as the incorrectly detected shot boundary is deleted, and thus, the two shots segmented by the shot boundary may be combined. Here, the value range of the threshold values $th\_simi_a$ and $th\_simi_g$ may be from 0.8 to 0.9.

In some usage situations, the executing body may also acquire a video shot set $S=\{S_t|t=1, \ldots, T\}$ from a shot boundary set $B=\{B_k|k=1, \ldots, k\}$ through the following steps. Here, B represents the shot boundary set. $B_k$ represents each shot boundary in the shot boundary set, k may be used to identify a shot boundary, and K may be used to represent the number of shot boundaries in the shot boundary set. In addition, S may be used to represent the video shot set, $S_t$ may be used to represent each video shot in the video shot set, t may be used to identify a video shot, and T may be used to represent the number of video shots in the video shot set.

First, the start position and the end position of the video are used as abruptly changed shot boundaries to be added to the set, i.e., $B=B\cup\{B_s, B_c\}$. Here, $B_s=(0, -1, 1)$, $B_c=(N, N-1, 1)$, and N is the number of images in the video. Here, B on the left side of the equal sign represents the set obtained after the addition, and B on the right side of the equal sign represents the set before addition. $B_s$ represents a video image at the start position of the video, and $B_c$ represents a video image at the end position of the video.

Then, consecutive video images between adjacent shot boundaries $B(bs_k, be_k, bt_k)$ and $B_{k+1}=(bs_{k+1}, be_{k+1}, bt_{k+1})$ are used as a shot, i.e., a shot $S_k=(be_{k+1}, bs_{k+1}-1, bt_k)$, thereby obtaining a shot set $S=\{S_k|k=1, \ldots, K-1\}$, which is equivalently represented as $S=\{S_t|t=1, \ldots, T\}$ after the subscript index is changed.

Accordingly, the video shot set may be obtained.

It should be noted that, for the steps included in the embodiment corresponding to FIG. 7, in addition to the features and effects described above, the embodiment may further include features and effects that are the same as or correspond to the features and effects in the embodiment of the method shown in FIG. 2 or FIG. 4, which will not be repeatedly described here.

It should also be noted that, the identical symbols in the expressions may be used to represent the same meanings, unless otherwise indicated.

It may be seen from FIG. 7 that, as compared with the embodiment corresponding to FIG. 2, the flow 700 of the method for segmenting a video in this embodiment emphasizes the step of performing the video shot segmentation on the to-be-segmented video. Accordingly, according to the scheme described in this embodiment, there are more approaches of segmenting the video, thereby further enriching the approach of segmenting the video, and further improving the approach of segmenting the video. In addition, the flow 700 of the method for segmenting a video in this embodiment further emphasizes the step of selecting the at least one video clip from the video clip set. Accordingly, according to the scheme described in this embodiment, the video clip may be selected from the video clip set in more ways, thereby further enriching the approach of segmenting the video, and further improving the accuracy and efficiency of the segmentation for the video.

Figure 8:
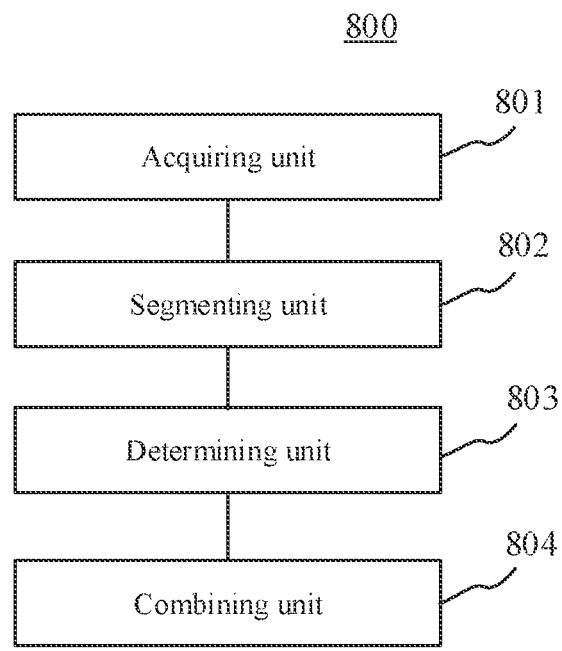
FIG. 8 is a schematic structural diagram of an apparatus for segmenting a video according to embodiments of the present disclosure.

Further referring to FIG. 8, as an implementation of the method shown in the drawings, embodiments of the present disclosure provides an apparatus for segmenting a video. The embodiment of the apparatus corresponds to the embodiment of the method shown in FIG. 2, and may include the features that are the same as or correspond to those in the embodiment of the method shown in FIG. 2, in addition to the features described below. The apparatus may be applied in various electronic devices.

As shown in FIG. 8, the apparatus 800 for segmenting a video in this embodiment includes: an acquiring unit 801, configured to acquire a to-be-segmented video; a segmenting unit 802, configured to perform video shot segmentation on the to-be-segmented video to obtain an initial video clip set; a determining unit 803, configured to select at least one video clip from the video clip set, and determine, for a video clip in the at least one video clip, a semantic similarity between two video clips adjacent to the video clip; and a combining unit 804, configured to perform combination processing on a video clip in the video clip set to obtain a final video clip set, the combination processing including: combining, for a semantic similarity in the determined semantic similarity, two video clips corresponding to the semantic similarity and a video clip between the two video clips corresponding to the semantic similarity, in response to determining that the semantic similarity is greater than a preset first similarity threshold value.

In this embodiment, the acquiring unit 801 in the apparatus 800 for segmenting a video may acquire the to-be-segmented video from an other electronic device by means of a wired connection or a wireless connection. Here, the to-be-segmented video may be a video on which segmentation is to be performed.

In this embodiment, the segmenting unit 802 may perform the video shot segmentation on the to-be-segmented video obtained by the acquiring unit 801, to obtain the initial video clip set. Here, the video shot segmentation is also referred to as a shot change detection, the purpose of which is to obtain a shot in the video. Here, the shot is composed of adjacent video frames in the video, and the shot is a basic unit constituting the video. As an example, the shot may refer to consecutive video frames corresponding to a scene in the video.

In this embodiment, the determining unit 803 may select the at least one video clip from the initial video clip set obtained by the segmenting unit 802, and determine for the video clip in the at least one video clip, the semantic similarity between the two video clips adjacent to the video clip.

In this embodiment, the combining unit 804 may perform the combination processing on the video clip in the video clip set to obtain the final video clip set, the combination processing including: combining, for the semantic similarity in the similarity determined by the determining unit 803, the two video clips corresponding to the semantic similarity and the video clip between the two video clips corresponding to the semantic similarity, in response to determining that the semantic similarity is greater than the preset first similarity threshold value. Here, the first similarity threshold value may be a preset semantic similarity numerical value. As an example, when the semantic similarity is represented by a numerical value between 0 and 1, the first similarity threshold value may be a numerical value between 0.8 and 0.9.

In some alternative implementations of this embodiment, the segmenting unit 802 may include: a segmenting sub-unit (not shown in the figure), configured to perform partial video shot segmentation on the to-be-segmented video. Here, video clips in the initial video clip set obtained by performing the partial video shot segmentation include a video clip representing a partial shot.

It should be noted that the partial video shot segmentation is excessive video shot segmentation, and the number of video clips obtained by performing the partial video shot segmentation on the to-be-segmented video may be greater than the number of shots included in the to-be-segmented video.

It may be appreciated that more video clips may be obtained by performing the partial video shot segmentation on the to-be-segmented video, and the obtained video clips may be combined through a subsequent step. Thus, the accuracy of segmenting the to-be-segmented video into shots may be improved, thereby enriching the approach of determining a shot from the video.

In some alternative implementations of this embodiment, the segmenting sub-unit may include: a determining module (not shown in the figure), configured to determine, for an adjacent video frame pair in at least one adjacent video frame pair included in the to-be-segmented video, a dissimilarity between two adjacent video frames included in the adjacent video frame pair based on two feature vectors of the two adjacent video frames included in the adjacent video frame pair; and a segmenting module (not shown in the figure), configured to perform the partial video shot segmentation on the to-be-segmented video based on the determined dissimilarity.

The adjacent video frame pair may refer to two adjacent video frames included in the to-be-segmented video. As an example, it is assumed that the to-be-segmented video includes a video frame 1, a video frame 2 and a video frame 3. The adjacent video frame pair included in the to-be-segmented video may refer to any one of: the video frame 1 and the video frame 2, or the video frame 2 and the video frame 3.

A feature vector may be used to represent a feature (e.g., a color feature and a texture feature) of a video frame. The method of extracting a feature vector of a video frame may be various feature vector extraction methods existing or now unknown but proposed in the future, for example, a color histogram or a histogram of oriented gradient (HOG).

It should be noted that the dissimilarity may generally represent a degree of dissimilarity between video frames. It may be appreciated that the scheme of calculating the dissimilarity may be converted into a scheme of calculating a similarity based on the same concept. Therefore, both the scheme of calculating the dissimilarity and the scheme of calculating the similarity shall fall within the scope of protection of the technical solution as claimed in the present disclosure.

The video frame change position may be a position of a video frame meeting a preset condition and included in the to-be-segmented video. The video frame change position may alternatively be obtained according to a predetermined method.

In some alternative implementations of this embodiment, the segmenting module may include: a determining sub-module (not shown in the figure), configured to determine a video frame change position of the to-be-segmented video based on the determined dissimilarity, to obtain a position information set representing the determined video frame change position; an adding sub-module (not shown in the figure), configured to add, for a video frame include in the to-be-segmented video, position information representing a position of the video frame in the to-be-segmented video to the position information set, in response to determining that the video frame meets a predetermined first preset condition; and a segmenting sub-module (not shown in the figure), configured to segment the to-be-segmented video at a position indicated by position information in the position information set obtained after the addition, to perform the partial video shot segmentation.

In some alternative implementations of this embodiment, the determining unit 803 may include: a deleting sub-unit (not shown in the figure), configured to delete, for position information in the position information set, the position information from the position information set, in response to determining that a dissimilarity between two video frames adjacent to a video frame at a position indicated by the position information is less than a predetermined dissimilarity threshold value: an extracting sub-unit (not shown in the figure), configured to extract position information belonging to a target category from the position information set after the deletion; a first determining sub-unit (not shown in the figure), configured to determine a position information pair meeting a second preset condition from the extracted position information; and a first selecting sub-unit (not shown in the figure), configured to select a video clip between two positions indicated by the determined position information pair from the video clip set.

The position information set may be the position information set obtained after the addition, or may be the position information set before the addition that represents the determined video frame change position (i.e., the position information set obtained in the first sub-step).

The dissimilarity threshold value may be a numerical value preset by a technician. For example, when the dissimilarity is represented by a numerical value between 0 and 1, and the larger the numerical value is, the higher the represented dissimilarity is, the dissimilarity threshold value may be 0.04, 0.05, or the like.

In some alternative implementations of this embodiment, the determining unit 803 may include: a second selecting sub-unit (not shown in the figure), configured to select respectively a predetermined number of video frames from the two video clips adjacent to the target video clip; and a second determining sub-unit (not shown in the figure), configured to determine the semantic similarity between the two video clips adjacent to the video clip based on an semantic similarity between the selected video frames.

Here, the predetermined number may be a predetermined number value (e.g., 1, 2, 3, 4, or the like). The two video clips adjacent to the target video clip may be a video clip preceding and adjacent to the target video clip, and a video clip following and adjacent to the target video clip.

The selected video frames may be the predetermined number of video frames that are respectively selected from the two video clips and close to the target video clip, or may be the predetermined number of video frames that are randomly selected.

In some alternative implementations of this embodiment, the second determining sub-unit may include: a first determining module (not shown in the figure), configured to determine, for a video frame in the selected predetermined number of video frames preceding the target video clip, semantic similarities between the video frame and video frames in the selected predetermined number of video frames following the target video clip; and a second determining module (not shown in the figure), configured to determine a semantic similarity having a maximum numerical value in the determined semantic similarities as the semantic similarity between the two video clips adjacent to the video clip.

According to the apparatus provided in the embodiment of the present disclosure, the acquiring unit 801 acquires the to-be-segmented video. Then, the segmenting unit 802 performs the video shot segmentation on the to-be-segmented video to obtain the initial video clip set. Next, the determining unit 803 selects the at least one video clip from the video clip set, and determines, for the video clip in the at least one video clip, the semantic similarity between the two video clips adjacent to the video clip. Finally, the combining unit 804 performs the combination processing on the video clip in the video clip set to obtain the final video clip set. The combination processing includes: combining, for the semantic similarity in the determined semantic similarity, the two video clips corresponding to the semantic similarity and the video clip between the two video clips corresponding to the semantic similarity, in response to determining that the semantic similarity is greater than the preset first similarity threshold value. Accordingly, the video shot segmentation is first performed on the to-be-segmented video, and then the video clips in the to-be-segmented video after the segmentation are combined. Thus, the accuracy and robustness of the video shot segmentation are improved, and the approach of segmenting the video is enriched, which is conductive to improving the efficiency of the segmentation for the video.

According to the method and apparatus for segmenting a video provided in embodiments of the present disclosure, the video shot segmentation is performed on the to-be-segmented video to obtain the initial video clip set. Then, the at least one video clip is selected from the video clip set. For the video clip in the at least one video clip, the semantic similarity between the two video clips adjacent to the video clip is determined. Finally, the two video clips corresponding to the semantic similarity greater than the preset first similarity threshold value in the determined semantic similarity and the video clip(s) between the two video clips are combined to obtain the final video clip set. Thus, the approach of segmenting the video is enriched, which is conductive to improving the accuracy of the video shot segmentation.

Figure 9:
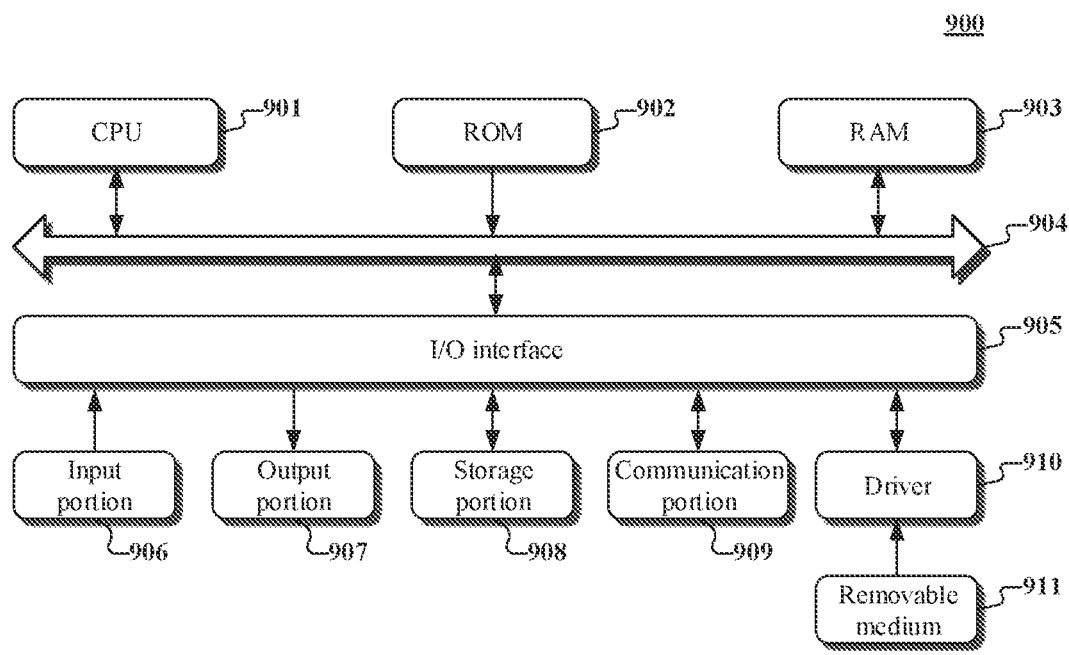
FIG. 9 is a schematic structural diagram of a computer system adapted to implement an electronic device according to embodiments of the present disclosure.

Referring to FIG. 9, FIG. 9 is a schematic structural diagram of a computer system 900 adapted to implement a control device according to embodiments of the present disclosure. The control device shown in FIG. 9 is merely an example, and should not bring any limitation to the functionalities and the scope of use of the embodiments of the present disclosure.

As shown in FIG. 9, the computer system 900 includes a central processing unit (CPU) 901, which may execute various appropriate actions and processes in accordance with a program stored in a read-only memory (ROM) 902 or a program loaded into a random access memory (RAM) 903 from a storage portion 908. The RAM 903 also stores various programs and data required by operations of the system 900. The CPU 901, the ROM 902 and the RAM 903 are connected to each other through a bus 904. An input/output (I/O) interface 905 is also connected to the bus 904.

The following components are connected to the I/O interface 905: an input portion 906 including a keyboard, a mouse, etc.; an output portion 907 including such as a cathode ray tube (CRT), a liquid crystal display device (LCD), a speaker, etc.; a storage portion 908 including a hard disk and the like; and a communication portion 909 including a network interface card, such as a LAN card and a modem. The communication portion 909 performs communication processes via a network, such as the Internet. A driver 910 is also connected to the I/O interface 905 as required. A removable medium 911, such as a magnetic disk, an optical disk, a magneto-optical disk, and a semiconductor memory, may be installed on the driver 910, to facilitate the retrieval of a computer program from the removable medium 911, and the installation thereof on the storage portion 908 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 909, and/or may be installed from the removable medium 911. The computer program, when executed by the central processing unit (CPU) 601, implements the above-mentioned functionalities as defined by the method of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable. RF medium etc., or any suitable combination of the above.

A computer program code for performing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The described units involved in the embodiments of the present disclosure may be implemented by means of software or hardware. The described units may also be provided in a processor. For example, the processor may be described as: a processor including an acquiring unit, a segmenting unit, a determining unit and a combining unit. Here, the names of these units do not in some cases constitute a limitation to such units themselves. For example, the acquiring unit may alternatively be described as "a unit for acquiring a to-be-segmented video."

In another aspect, an embodiment of the present disclosure further provides a computer readable medium. The computer readable medium may be the computer readable medium included in the electronic device described in the embodiments, or a stand-alone computer readable medium not assembled into the electronic device. The computer readable medium carries one or more programs. The one or more programs, when executed by the electronic device, cause the electronic device to: acquire a to-be-segmented video; perform video shot segmentation on the to-be-segmented video to obtain an initial video clip set; select at least one video clip from the video clip set, and determine, for a video clip in the at least one video clip, a semantic similarity between two video clips adjacent to the video clip; and perform combination processing on a video clip in the video clip set to obtain a final video clip set, the combination processing including: combining, for a semantic similarity in the determined semantic similarity, two video clips corresponding to the semantic similarity and a video clip between the two video clips corresponding to the semantic similarity, in response to determining that the semantic similarity is greater than a preset first similarity threshold value.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for segmenting a video, comprising:
   performing video shot segmentation on a to-be-segmented video to obtain an initial video clip set, comprising: segmenting the to-be-segmented video according to a change position in video frames of the to-be-segmented video, wherein the change position comprises a position of a video frame of the to-be-segmented video, a dissimilarity between the video frame and an adjacent video frame thereof being greater than a dissimilarity threshold value, and the dissimilarity threshold value comprises a product of a maximum dissimilarity in dissimilarities between adjacent video frames in the to-be-segmented video and a predetermined numerical value;
   selecting at least one video clip from the initial video clip set;
   for a video clip in the selected at least one video clip, determining a semantic similarity between two video clips adjacent to the video clip; and
   in response to the determined semantic similarity between the two video clips adjacent to the video clip being greater than a preset first similarity threshold value, combining the two video clips adjacent to the video clip and the video clip, to obtain a final video clip set.

2. The method according to claim 1, wherein the performing video shot segmentation on the to-be-segmented video comprises:
   performing partial video shot segmentation on the to-be-segmented video, wherein video clips in the initial video clip set obtained by performing the partial video shot segmentation comprise a video clip representing a partial shot.

3. The method according to claim 2, wherein the performing partial video shot segmentation on the to-be-segmented video comprises:

determining, for an adjacent video frame pair in at least one adjacent video frame pair included in the to-be-segmented video, a dissimilarity between two adjacent video frames included in the adjacent video frame pair based on two feature vectors of the two adjacent video frames included in the adjacent video frame pair; and performing the partial video shot segmentation on the to-be-segmented video based on the determined dissimilarity.

4. The method according to claim 3, wherein the performing the partial video shot segmentation on the to-be-segmented video based on the determined dissimilarity comprises:

determining the change position in the video frames of the to-be-segmented video based on the determined dissimilarity, to obtain a position information set representing the determined change position;

adding, for a video frame included in the to-be-segmented video, position information representing a position of the video frame included in the to-be-segmented video to the position information set, in response to determining that the video frame meets a predetermined first preset condition; and segmenting the to-be-segmented video according to positions indicated by position information in the position information set obtained after the addition, to perform the partial video shot segmentation.

5. The method according to claim 4, wherein the selecting at least one video clip from the video clip set comprises:

for a piece of position information in the position information set, deleting the piece of position information from the position information set in response to determining that a dissimilarity between two video frames adjacent to a video frame located at a position indicated by the piece of position information is less than a predetermined dissimilarity threshold value.

6. The method according to claim 5, wherein the method further comprises determining the dissimilarity threshold value, comprising:

determining a mean value of dissimilarities corresponding to video frames included in the to-be-segmented video; and determining a product of the obtained mean value and a predetermined numerical value as the dissimilarity threshold value.

7. The method according to claim 4, wherein the selecting at least one video clip from the video clip set further comprises:

extracting position information belonging to a target category from the position information set;

determining a position information pair meeting a second preset condition from the extracted position information; and selecting a video clip between two positions indicated by the determined position information pair from the video clip set.

8. The method according to claim 7, wherein the second preset condition comprises:

a number of video frames included between video frames at positions respectively indicated by two pieces of position information included in the position information pair being less than or equal to a third predetermined numerical value.

9. The method according to claim 7, wherein the second preset condition comprises:

a difference value between a dissimilarity corresponding to a latter piece of position information included in the position information pair and a dissimilarity corresponding to a former piece of position information included in the position information pair being less than or equal to a fourth predetermined numerical value;

a quotient of a small similarity of the position information pair and a large similarity of the position information pair being greater than or equal to a fifth predetermined numerical value; and a quotient of a minimum similarity of the position information pair and a sum of similarities of the position information pair being greater than or equal to a sixth predetermined numerical value.

10. The method according to claim 7, wherein the method further comprises determining a category of position information, comprising:

determining position information of a first video frame and a last video frame in the to-be-segmented video as position information of an abrupt change category; and determining, for each video frame in video frames from a second video frame to a next-to-last video frame in the to-be-segmented video, position information of a current video frame as position information of the abrupt change category in response to the current video frame satisfying a predetermined abrupt change condition; otherwise, determining the position information of the current video frame as position information of a gradual change category, wherein the abrupt change condition comprises at least one of: a small difference value of the current video frame being greater than or equal to a first predetermined numerical value, a quotient of the small difference value of the current video frame and a large difference value of the current video frame being greater than or equal to a second predetermined numerical value, or the small difference value of the current video frame being less than or equal to the third predetermined numerical value, and wherein a difference value between a dissimilarity corresponding to the current video frame and a dissimilarity corresponding to a previous video frame of the current video frame is a first difference value of the current video frame, a difference value between the dissimilarity corresponding to the current video frame and a dissimilarity corresponding to a next video frame of the current video frame is a second difference value of the current video frame, and a larger difference value in the first difference value and the second difference value is the large difference value, and a smaller difference value in the first difference value and the second difference value is the small difference value.

11. The method according to claim 4, wherein adding the position information representing the position of the video frame in the to-be-segmented video to the position information set in response to determining that the video frame meets the predetermined first preset condition comprises:

adding, for each video frame, position information of a next video frame of the video frame to the position information set, in response to a dissimilarity corresponding to the next video frame of the video frame being greater than or equal to a dissimilarity corresponding to the video frame and in response to position information of the video frame belonging to the position information set, the addition starting from a first video frame in the to-be-segmented video, and going backwards in sequence until a next-to-last video frame in the to-be-segmented video; and/or adding, for each video frame, position information of a position of the video frame to the position information set, in response to a dissimilarity corresponding to the video frame being greater than or equal to a dissimilarity corresponding to a next video frame of the video frame and in response to position information of the next video frame of the video frame belonging to the position information set, the addition starting from the next-to-last video frame in the to-be-segmented video and going forwards in sequence until the first video frame in the to-be-segmented video.

12. The method according to claim 3, wherein the feature vector refers to:

a color histogram or a histogram of oriented gradient.

13. The method according to claim 3, wherein determining the dissimilarity between two adjacent video frames included in the adjacent video frame pair comprises: acquiring the dissimilarity based on the color histogram and through a normalization method or a histogram cross kernel method.

14. The method according to claim 1, wherein determining the semantic similarity between the two video clips adjacent to the video clip comprises:

selecting a predetermined number of video frames from a video clip preceding and adjacent to a target video clip, and selecting video frames of the predetermined number from a video clip following and adjacent to the target video clip; and determining the semantic similarity between the two video clips adjacent to the target video clip based on semantic similarities between the selected video frames.

15. The method according to claim 14, wherein the determining the semantic similarity between the two video clips adjacent to the target video clip based on semantic similarities between the selected video frames comprises:

determining, for a video frame in the selected predetermined number of video frames preceding the target video clip, semantic similarities between the video frame and video frames in the selected predetermined number of video frames following the target video clip; and determining a maximum semantic similarity in the determined semantic similarities as the semantic similarity between the two video clips adjacent to the video clip.

16. The method according to claim 15, wherein the determining, for a video frame in the selected predetermined number of video frames preceding the target video clip, semantic similarities between the video frame and video frames in the selected predetermined number of video frames following the target video clip comprises:

inputting the video frame in the predetermined number of video frames preceding the target video clip and the video frames in the predetermined number of video frames following the target video clip into a deep learning based classification model, to obtain an embedded feature vector of the video frames;

calculating cosine similarities between the video frame in the predetermined number of video frames preceding the target video clip and the video frames in the predetermined number of video frames following the target video clip based on the embedded feature vector; and determining the cosine similarities as the semantic similarities between the video frame in the predetermined number of video frames preceding the target video clip and the video frames in the predetermined number of video frames following the target video clip.

17. The method according to claim 1, wherein, for the video clip in the at least one video clip, the semantic similarity between the two video clips adjacent to the video clip is greater than the preset first similarity threshold value, in response to a non-scene change existing between the two video clips adjacent to the video clip.

18. The method according to claim 17, wherein the non-scene change comprises an illumination change, and an intensive movement of a person or an object in a scene.

19. An apparatus for segmenting a video, comprising:
one or more processors; and
a storage apparatus, configured to store one or more programs,
wherein the one or more programs, when executed by the one or more processors, cause the one or more processors to perform operations, the operations comprising:
performing video shot segmentation on a to-be-segmented video to obtain an initial video clip set, comprising: segmenting the to-be-segmented video according to a change position in video frames of the to-be-segmented video, wherein the change position comprises a position of a video frame of the to-be-segmented video, a dissimilarity between the video frame and an adjacent video frame thereof being greater than a dissimilarity threshold value, and the dissimilarity threshold value comprises a product of a maximum dissimilarity in dissimilarities between adjacent video frames in the to-be-segmented video and a predetermined numerical value;
selecting at least one video clip from the initial video clip set;
for a video clip in the selected at least one video clip, determining a semantic similarity between two video clips adjacent to the video clip; and
in response to the determined semantic similarity between the two video clips adjacent to the video clip being greater than a preset first similarity threshold value, combining the two video clips adjacent to the video clip and the video clip, to obtain a final video clip set.

20. A non-transitory computer readable medium, storing a computer program, wherein the program, when executed by a processor, causes the processor to perform operations, the operations comprising:
performing video shot segmentation on a to-be-segmented video to obtain an initial video clip set, comprising: segmenting the to-be-segmented video according to a change position in video frames of the to-be-segmented video, wherein the change position comprises a position of a video frame of the to-be-segmented video, a dissimilarity between the video frame and an adjacent video frame thereof being greater than a dissimilarity threshold value, and the dissimilarity threshold value comprises a product of a maximum dissimilarity in dissimilarities between adjacent video frames in the to-be-segmented video and a predetermined numerical value;
selecting at least one video clip from the initial video clip set;

for a video clip in the selected at least one video clip, determining a semantic similarity between two video clips adjacent to the video clip; and in response to the determined semantic similarity between the two video clips adjacent to the video clip being greater than a preset first similarity threshold value, combining the two video clips adjacent to the video clip and the video clip, to obtain a final video clip set.

* * * * *